(12) United States Patent
Wang et al.

(10) Patent No.: US 11,152,701 B2
(45) Date of Patent: Oct. 19, 2021

(54) PHASE COMPENSATED MULTI-LAYER, MULTI-STEERING ANTENNA ARRAY FOR MILLIMETER WAVE APPLICATIONS

(71) Applicant: Metawave Corporation, Palo Alto, CA (US)

(72) Inventors: Yan Wang, Palo Alto, CA (US); Maha Achour, Encinitas, CA (US)

( * ) Notice: Subject to any disclaimer, the term of this patent is extended or adjusted under 35 U.S.C. 154(b) by 294 days.

(21) Appl. No.: 16/457,362

(22) Filed: Jun. 28, 2019

(65) Prior Publication Data

US 2020/0028259 A1 Jan. 23, 2020

Related U.S. Application Data

(60) Provisional application No. 62/691,395, filed on Jun. 28, 2018.

(51) Int. Cl.
| | | |
|---|---|---|
| *H01Q 3/34* | (2006.01) | |
| *H01Q 21/29* | (2006.01) | |
| *H01Q 21/00* | (2006.01) | |
| *G01S 7/03* | (2006.01) | |
| *G01S 13/931* | (2020.01) | |
| *H01Q 1/32* | (2006.01) | |
| *G01S 13/00* | (2006.01) | |

(52) U.S. Cl.
CPC .............. *H01Q 3/34* (2013.01); *G01S 7/032* (2013.01); *G01S 13/931* (2013.01); *H01Q 21/0087* (2013.01); *H01Q 21/293* (2013.01); *H01Q 1/32* (2013.01); *H01Q 21/0006* (2013.01)

(58) Field of Classification Search
None
See application file for complete search history.

(56) References Cited

U.S. PATENT DOCUMENTS

| | | | | |
|---|---|---|---|---|
| 5,400,042 | A * | 3/1995 | Tulintseff | H01Q 21/24 343/727 |
| 6,078,289 | A * | 6/2000 | Manoogian | H01Q 21/0025 342/373 |
| 7,808,427 | B1 * | 10/2010 | Sarcione | G01S 7/034 342/188 |
| 8,866,686 | B1 * | 10/2014 | Sikina | H01Q 21/0043 343/771 |
| 9,019,153 | B1 * | 4/2015 | Schuss | H01Q 21/005 342/165 |
| 9,070,964 | B1 * | 6/2015 | Schuss | H01Q 3/40 |
| 9,086,476 | B1 * | 7/2015 | Schuss | G01S 13/003 |

(Continued)

*Primary Examiner* — Bernarr E Gregory
(74) *Attorney, Agent, or Firm* — Sandra Lynn Godsey

(57) ABSTRACT

Examples disclosed herein relate to a multi-layer, multi-steering ("MLMS") antenna array for millimeter wavelength applications. The MLMS antenna array includes a superelement antenna array layer comprising a plurality of superelement subarrays. In some aspects, each superelement subarray of the plurality of superelement subarrays includes a plurality of phase compensated slots for radiating a transmission signal. The MLMS antenna array also includes a power division layer configured to serve as a feed to the superelement antenna array layer. The MLMS antenna array also includes a top layer disposed on the superelement antenna array layer. The top layer may include a superstrate or a metamaterial antenna array. Other examples disclosed herein include a radar system for use in an autonomous driving vehicle.

20 Claims, 19 Drawing Sheets

(56) References Cited

U.S. PATENT DOCUMENTS

| | | | |
|---|---|---|---|
| 9,373,888 B1* | 6/2016 | Schuss | H01Q 21/005 |
| 2018/0351250 A1* | 12/2018 | Achour | G01S 13/931 |
| 2019/0131721 A1* | 5/2019 | Dani | G01S 7/032 |

* cited by examiner

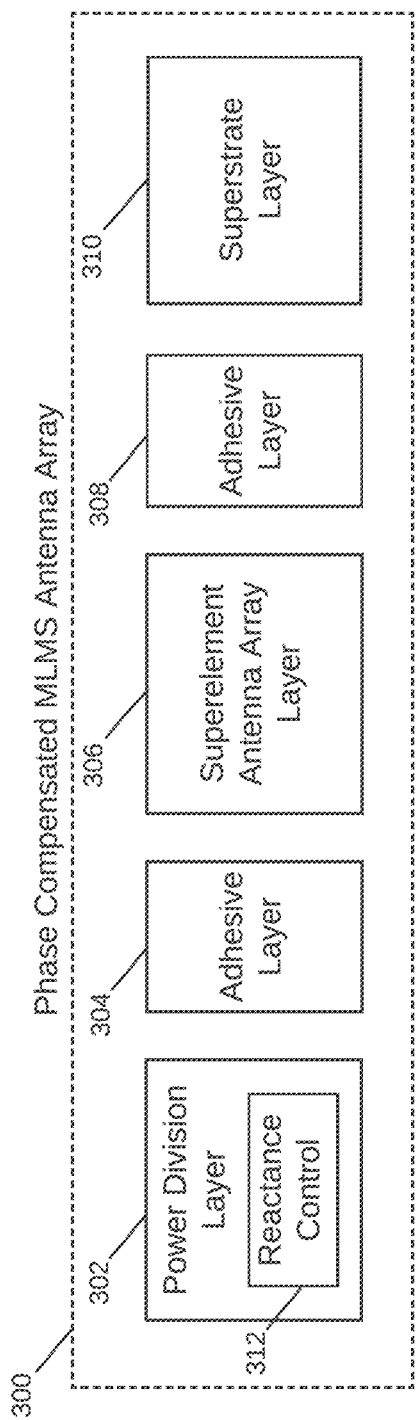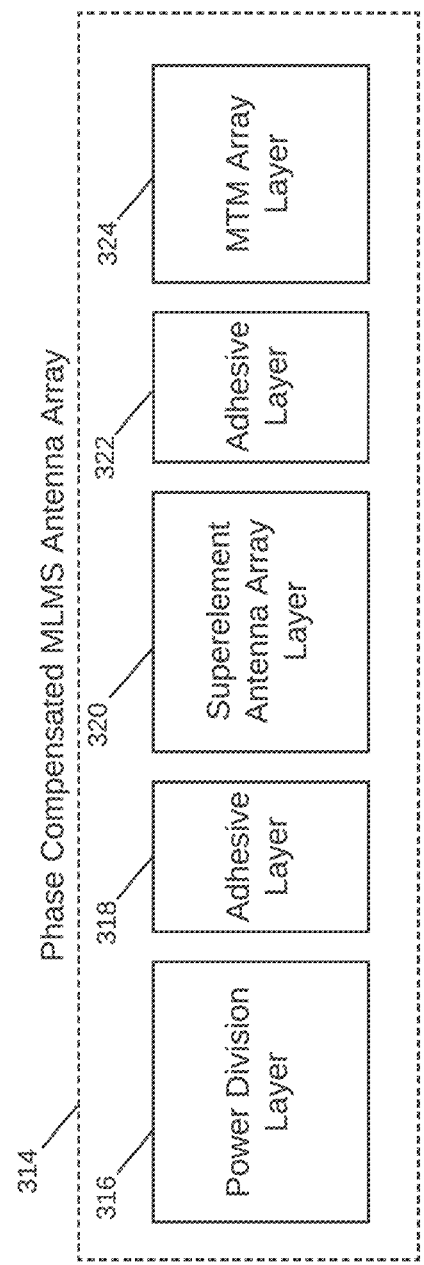
FIG. 3A
FIG. 3B

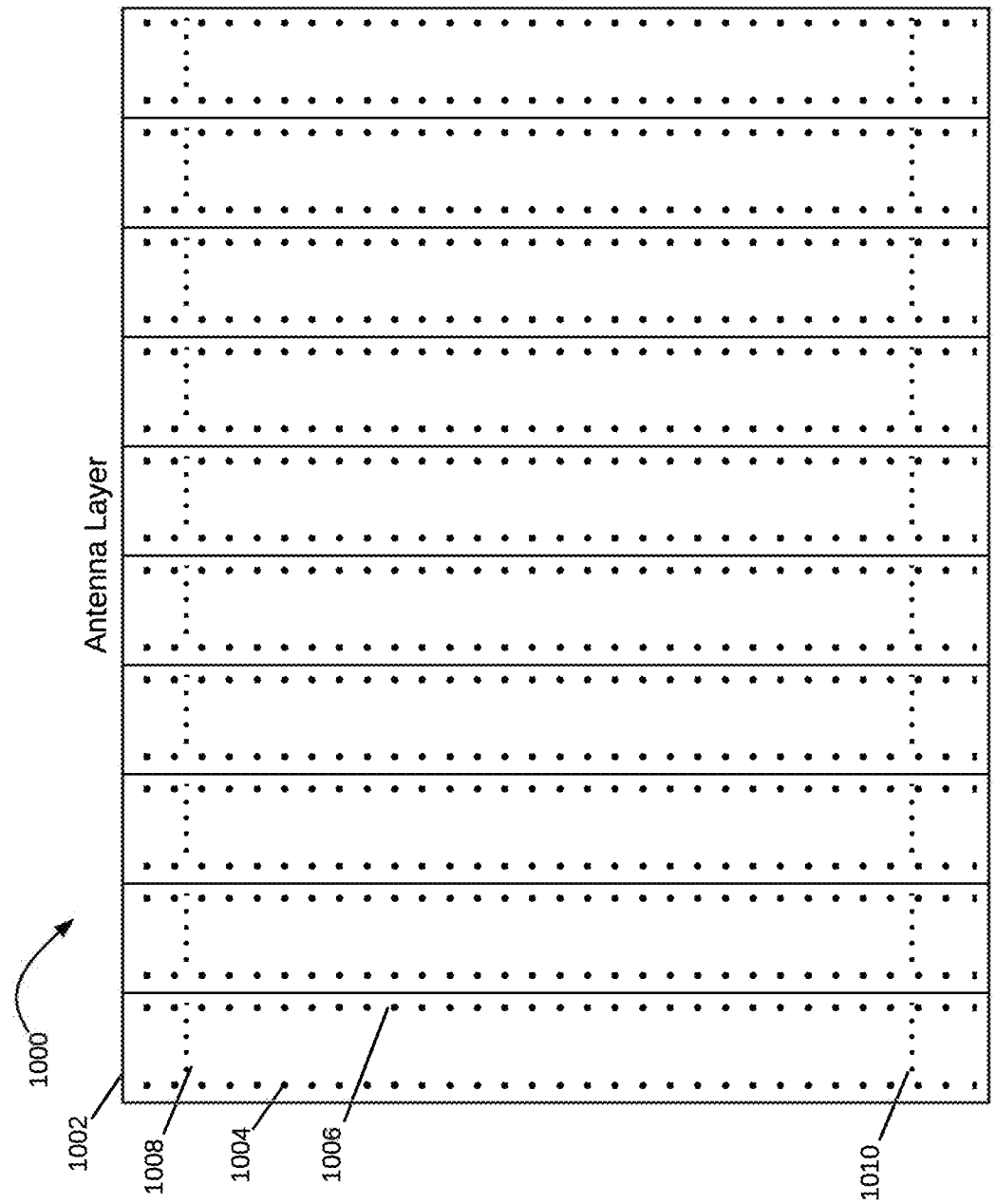

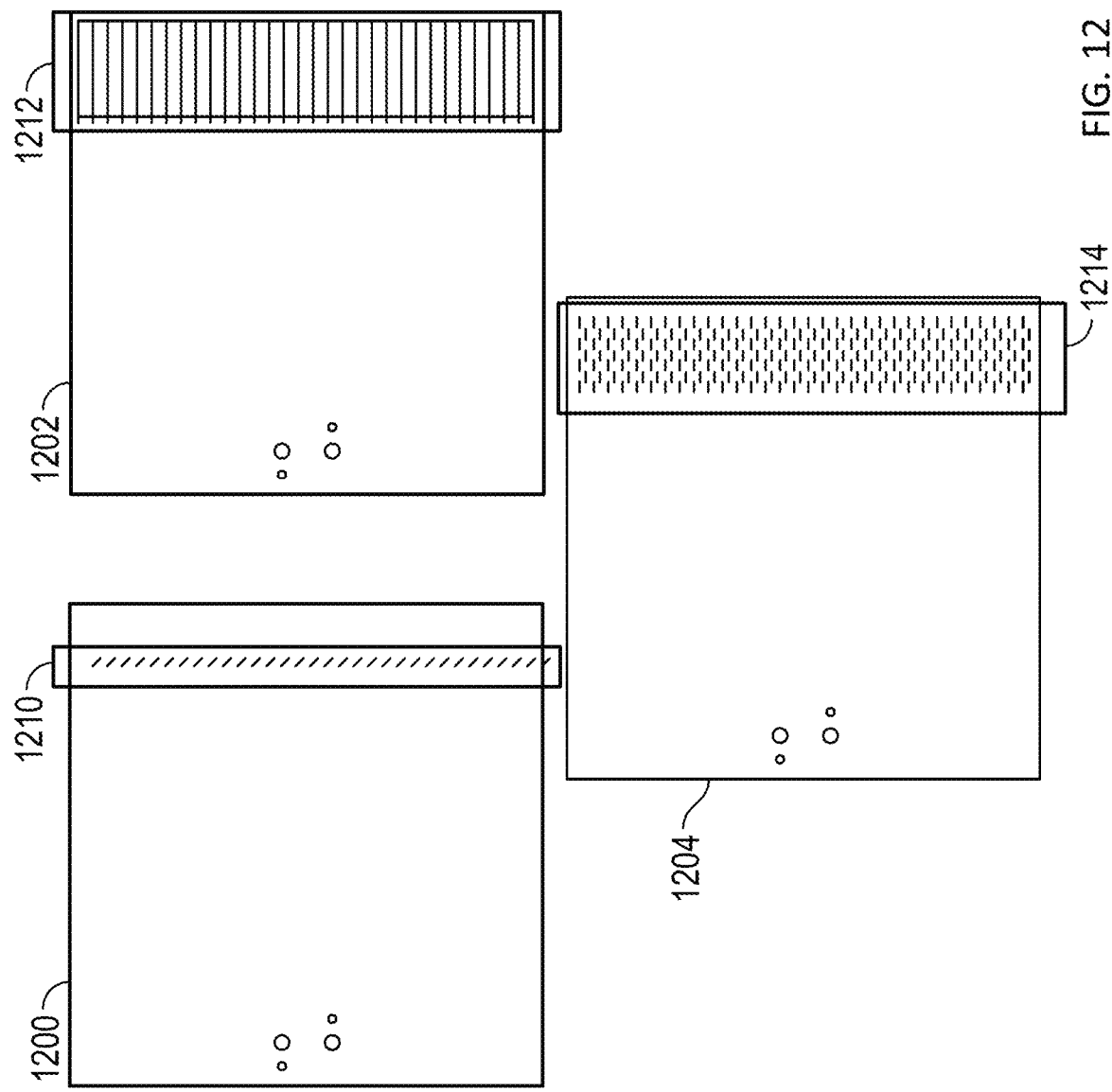

PHASE COMPENSATED MULTI-LAYER, MULTI-STEERING ANTENNA ARRAY FOR MILLIMETER WAVE APPLICATIONS

CROSS-REFERENCE TO RELATED APPLICATIONS

This application claims priority from U.S. Provisional Application No. 62/691,395, titled "PHASE COMPENSATED MULTI-LAYER, MULTI-STEERING ANTENNA ARRAY FOR MILLIMETER WAVE APPLICATIONS," filed on Jun. 28, 2018, and incorporated herein by reference in its entirety.

BACKGROUND

Autonomous driving is quickly moving from the realm of science fiction to becoming an achievable reality. Already in the market are Advanced-Driver Assistance Systems ("ADAS") that automate, adapt and enhance vehicles for safety and better driving. The next step will be vehicles that increasingly assume control of driving functions such as steering, accelerating, braking and monitoring the surrounding environment and driving conditions to respond to events, such as changing lanes or speed when needed to avoid traffic, crossing pedestrians, animals, and so on.

An aspect of making this work is the ability to detect and classify targets in the surrounding environment at the same or possibly even better level as humans. Humans are adept at recognizing and perceiving the world around them with an extremely complex human visual system that essentially has two main functional parts: the eye and the brain. In autonomous driving technologies, the eye may include a combination of multiple sensors, such as camera, radar, and lidar, while the brain may involve multiple artificial intelligence, machine learning and deep learning systems. The goal is to have full understanding of a dynamic, fast-moving environment in real time and human-like intelligence to act in response to changes in the environment.

BRIEF DESCRIPTION OF THE DRAWINGS

The present application may be more fully appreciated in connection with the following detailed description taken in conjunction with the accompanying drawings, in which like reference characters refer to like parts throughout, and in which:

FIGS. 3A-3C illustrate other examples of a phase compensated MLMS antenna array for use in the antenna module of FIG. 2 in accordance with some implementations of the subject technology;

FIG. 10 illustrates an antenna layer for use with the superelement antenna array layer of FIG. 9 in accordance with some implementations of the subject technology;

FIG. 12 illustrates a schematic diagram illustrating individual layers in a superelement antenna array layer in accordance with some implementations of the subject technology;

DETAILED DESCRIPTION

A phase compensated Multi-Layer, Multi-Steering ("MLMS") antenna array for millimeter wavelength ("mm-wave") applications is disclosed. The phase compensated MLMS antenna array is suitable for many different mm-wave applications and can be deployed in a variety of different environments and configurations. Mm-wave applications can operate with frequencies between 30 and 300 GHz or a portion thereof, including autonomous driving applications in the 77 GHz range and 5G applications in the 60 GHz range, among others. In various examples, the phase compensated MLMS antenna array is incorporated in a radar in an autonomous driving vehicle to detect and identify targets in the vehicle's path and surrounding environment. The targets may include structural elements in the environment such as roads, walls, buildings, road center medians and other objects, as well as vehicles, pedestrians, bystanders, cyclists, plants, trees, animals and so on. The phase compensated MLMS antenna array enables a radar to be a "digital eye" with true 3D vision and human-like interpretation of the world.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology. In other instances, well-known methods and structures may not be described in detail to avoid unnecessarily obscuring the description of the examples. Also, the examples may be used in combination with each other.

Figure 1:
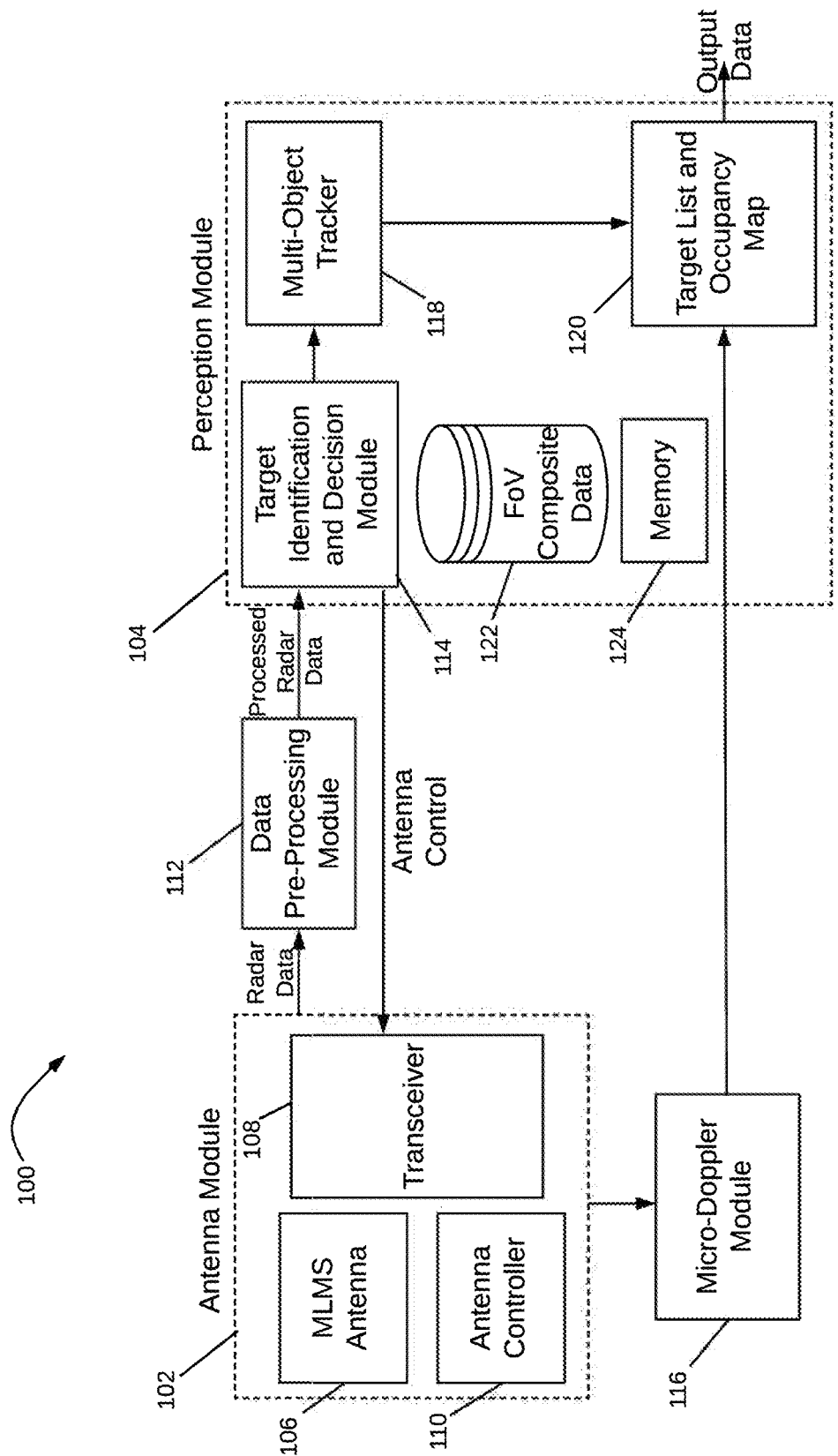
FIG. 1 illustrates a schematic diagram of a radar system for use in an autonomous driving system in accordance with some implementations of the subject technology.

FIG. 1 illustrates a schematic diagram of a radar system 100 in accordance with some implementations of the subject technology. The radar system 100 includes an antenna Module 102 and a perception Module 104. The radar system 100 is a "digital eye" with true 3D vision and capable of a human-like interpretation of the world. The "digital eye" and human-like interpretation capabilities are provided by the two main modules: the antenna module 102 and the perception module 104. Not all of the depicted components may be used, however, and one or more implementations may include additional components not shown in the figure. Variations in the arrangement and type of the components may be made without departing from the scope of the claims set forth herein. Additional components, different components, or fewer components may be provided.

The iMTM antenna module 102 includes a MLMS antenna 106, a transceiver module 108 and an antenna controller 110. The MLMS antenna 106 can radiate dynamically controllable and highly-directive Radio Frequency (RF) beams using meta-structures. A meta-structure, as generally defined herein, is an engineered, non- or semi-periodic structure that is spatially distributed to meet a specific phase and frequency distribution. In some implementations, the meta-structures include metamaterials. The transceiver module 108 is coupled to the MLMS antenna 106, and prepares a signal for transmission, such as a signal for a radar device. In some aspects, the signal is defined by modulation and frequency. The signal is provided to the MLMS antenna 106 through a coaxial cable or other connector and propagates through the antenna structure for transmission through the air via RF beams at a given phase, direction, and so on. The RF beams and their parameters (e.g., beam width, phase, azimuth and elevation angles, etc.) are controlled by antenna controller 110, such as at the direction of perception module 104.

The RF beams reflect from targets in the ego vehicle's path and surrounding environment, and the RF reflections are received by the transceiver module 108. Radar data from the received RF beams is provided to the perception module 104 for target detection and identification. A super-resolution network 112 increases the resolution of the radar data prior to it being processed to detect and identify targets. For example, the super-resolution network 112 can process the radar data and determine high resolution radar data for use by the perception module 104. In various examples, the super-resolution network 112 can be a part of the perception module 104, such as on the same circuit board as the other modules within the perception module 104. Also, in various examples, the data encoding may use the lidar point cloud from the ego lidar to perform NLOS correction in the radar data.

The radar data may be organized in sets of Range-Doppler (RD) map information, corresponding to four-dimensional (4D) information that is determined by each RF beam reflected from targets, such as azimuthal angles, elevation angles, range, and velocity. The RD maps may be extracted from FMCW radar signals and may contain both noise and systematic artifacts from Fourier analysis of the radar signals. The perception module 104 controls further operation of the iMTM antenna module 102 by, for example, providing an antenna control signal containing beam parameters for the next RF beams to be radiated from MTM cells in the MLMS antenna 106.

In operation, the antenna controller 110 is responsible for directing the MLMS antenna 106 to generate RF beams with determined parameters such as beam width, transmit angle, and so on. The antenna controller 110 may, for example, determine the parameters at the direction of perception module 104, which may at any given time determine to focus on a specific area of a Field-of-View (FoV) upon identifying targets of interest in the ego vehicle's path or surrounding environment. The antenna controller 110 determines the direction, power, and other parameters of the RF beams and controls the MLMS antenna 106 to achieve beam steering in various directions. The antenna controller 110 also determines a voltage matrix to apply to reactance control mechanisms coupled to the MLMS antenna 106 to achieve a given phase shift. In some examples, the MLMS antenna 106 is adapted to transmit a directional beam through active control of the reactance parameters of the individual MTM cells that make up the MLMS antenna 106. The perception module 104 provides control actions to the antenna controller 110 at the direction of the Target Identification and Decision Module 114.

Next, the MLMS antenna 106 radiates RF beams having the determined parameters. The RF beams are reflected from targets in and around the ego vehicle's path (e.g., in a 360° field of view) and are received by the transceiver module 108 in iMTM antenna module 102. The iMTM antenna module 102 transmits the received 4D radar data to the super-resolution network 112 for increasing the resolution of the radar data, for which higher resolution radar data is then sent to the target identification and decision module 114 of the perception module 104. The use of the super-resolution network 112 also improves the training and performance of the target identification and decision module 114. A micro-doppler module 116 coupled to the iMTM antenna module 102 and the perception module 104 extracts micro-doppler signals from the 4D radar data to aid in the identification of targets by the perception module 104. The micro-doppler module 116 takes a series of RD maps from the iMTM antenna module 102 and extracts a micro-doppler signal from them. The micro-doppler signal enables a more accurate identification of targets as it provides information on the occupancy of a target in various directions. Non-rigid targets such as pedestrians and cyclists are known to exhibit a time-varying doppler signature due to swinging arms, legs, etc. By analyzing the frequency of the returned radar signal over time, the perception module 104 can determine the class of the target (i.e., whether a vehicle, pedestrian, cyclist, animal, etc.) with over 90% accuracy. Further, as this classification may be performed by a linear Support Vector Machine (SVM), it is extremely computationally efficient. In various examples, the micro-doppler module 116 can be a part of the iMTM antenna module 102 or the perception module 104, such as on the same circuit board as the other modules within the iMTM antenna module 102 or perception module 104.

The target identification and decision module 114 receives the higher resolution radar data from the super-resolution network 112, processes the data to detect and identify targets, and determines the control actions to be performed by the iMTM antenna module 102 based on the detection and identification of such targets. For example, the target identification and decision module 114 may detect a cyclist on the path of the ego vehicle and direct the iMTM antenna module 102, at the instruction of its antenna controller 110, to focus additional RF beams at a given phase shift and direction within the portion of the FoV corresponding to the cyclist's location.

The perception module 104 may also include a multi-object tracker 118 to track the identified targets over time, such as, for example, with the use of a Kalman filter. The multi-object tracker 118 matches candidate targets identified by the target identification and decision module 114 with targets it has detected in previous time windows. By combining information from previous measurements, expected measurement uncertainties, and some physical knowledge, the multi-object tracker 118 generates robust, accurate estimates of target locations.

Information on identified targets over time are then stored at a target list and occupancy map 120, which keeps track of targets' locations and their movement over time as determined by the multi-object tracker 118. The tracking information provided by the multi-object tracker 118 and the micro-doppler signal provided by the micro-doppler module 116 are combined at the target list and occupancy map 120 to produce an output containing the type/class of target identified, their location, their velocity, and so on. This information from iMTM radar system 100 is then sent to a sensor fusion module (not shown), where it is processed together with information from other sensors in the ego vehicle.

In various examples, the perception module 104 includes an FoV composite data unit 122, which stores information that describes an FoV. This information may be historical data used to track trends and anticipate behaviors and traffic conditions or may be instantaneous or real-time data that describes the FoV at a moment in time or over a window in time. The ability to store this data enables the perception module 104 to make decisions that are strategically targeted at a particular point or area within the FoV. For example, the FoV may be clear (e.g., no echoes received) for a period of time (e.g., five minutes), and then one echo arrives from a specific region in the FoV; this is similar to detecting the front of a car. In response, the perception module 104 may determine to narrow the beam width for a more focused view of that sector or area in the FoV. The next scan may indicate the targets' length or other dimension, and if the target is a vehicle, the perception module 104 may consider what direction the target is moving and focus the beams on that area. Similarly, the echo may be from a spurious target, such as a bird, which is small and moving quickly out of the path of the vehicle. There are a variety of other uses for the FoV composite data 122, including the ability to identify a specific type of target based on previous detection. The perception module 104 also includes a memory 124 that stores useful data for iMTM radar system 100, such as, for example, information on which subarrays of the MLMS antenna 106 perform better under different conditions.

In various examples described herein, the use of iMTM radar system 100 in an autonomous driving vehicle provides a reliable way to detect targets in difficult weather conditions. For example, historically a driver will slow down dramatically in thick fog, as the driving speed decreases along with decreases in visibility. On a highway in Europe, for example, where the speed limit is 115 km/h, a driver may need to slow down to 10 km/h when visibility is poor. Using the iMTM radar system 100, the driver (or driverless vehicle) may maintain the maximum safe speed without regard to the weather conditions. Even if other drivers slow down, a vehicle enabled with the iMTM radar system 100 can detect those slow-moving vehicles and obstacles in its path and avoid/navigate around them.

Additionally, in highly congested areas, it is necessary for an autonomous vehicle to detect targets in sufficient time to react and take action. The examples provided herein for an iMTM radar system increase the sweep time of a radar signal so as to detect any echoes in time to react. In rural areas and other areas with few obstacles during travel, the perception module 104 adjusts the focus of the RF beam to a larger beam width, thereby enabling a faster scan of areas where there are few echoes. The perception module 104 may detect this situation by evaluating the number of echoes received within a given time period and making beam size adjustments accordingly. Once a target is detected, the perception module 104 determines how to adjust the beam focus. This is achieved by changing the specific configurations and conditions of the MLMS antenna 106. In one example scenario, the voltages on the reactance control mechanisms of the reactance control module of MLMS antenna 106 are adjusted. In another example scenario, a subset of iMTM unit cells is configured as a subarray. This configuration means that this set may be treated as a single unit, and all the cells within the subarray are adjusted similarly. In another scenario, the subarray is changed to include a different number of unit cells, where the combination of iMTM unit cells in a subarray may be changed dynamically to adjust to conditions and operation of the iMTM radar system 100.

All of these detection scenarios, analysis and reactions may be stored in the perception module 104, such as in the memory 124, and used for later analysis or simplified reactions. For example, if there is an increase in the echoes received at a given time of day or on a specific highway, that information is fed into the antenna controller 110 to assist in proactive preparation and configuration of the MLMS antenna 106. Additionally, there may be some subarray combinations that perform better, such as to achieve a desired result, and this is stored in the memory 124.

Figure 2:
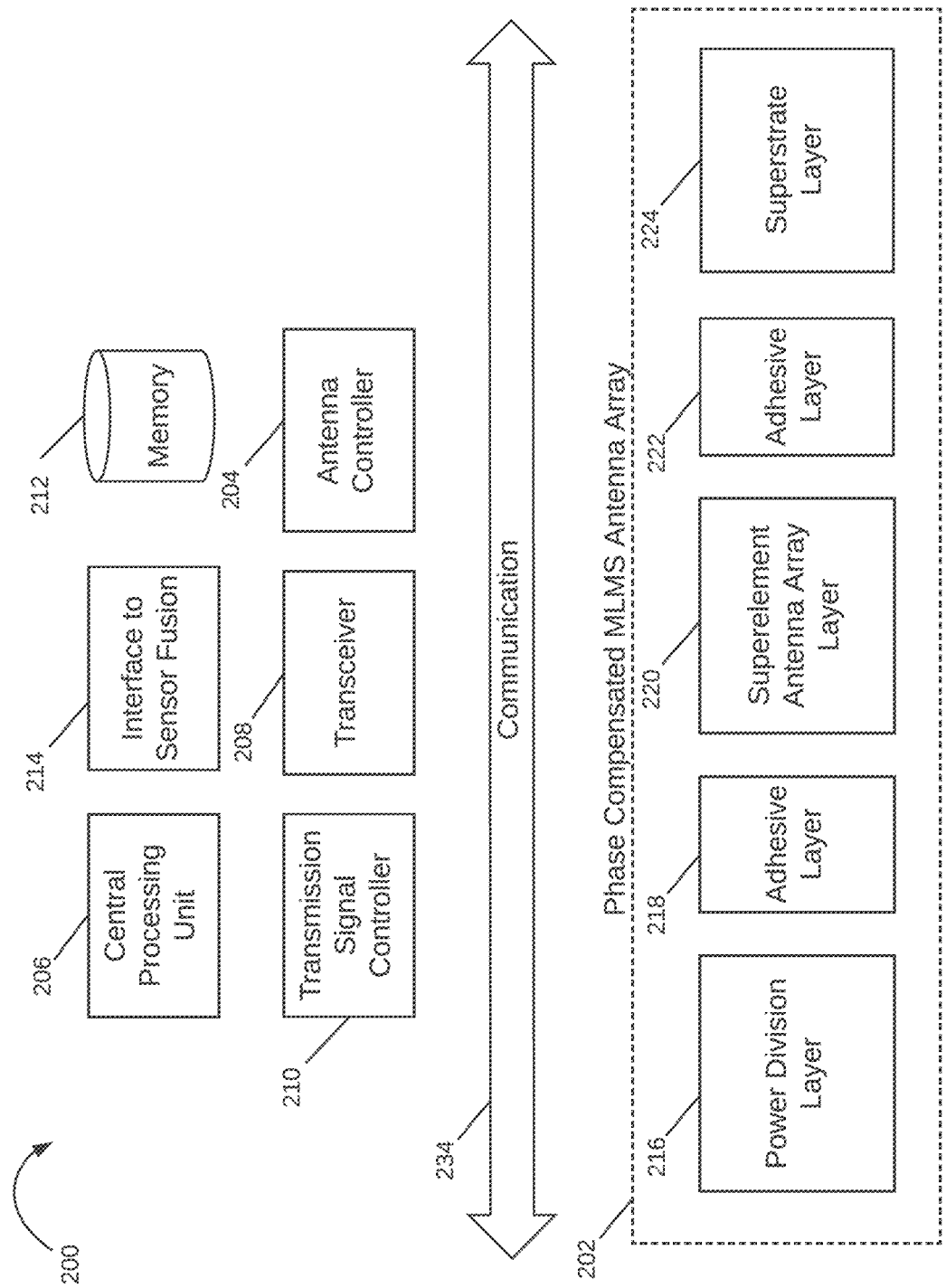
FIG. 2 illustrates a schematic diagram of an antenna module for use with the radar system of FIG. 1 in accordance with some implementations of the subject technology.

Attention is now directed to FIG. 2, which shows a schematic diagram of an antenna module 200 for use with the radar system 100 of FIG. 1 in accordance with some implementations of the subject technology. The antenna module 200 has a phase compensated MLMS antenna array 202 coupled to an antenna controller 204, a central processor 206, and a transceiver 208. A transmission signal controller 210 generates the specific transmission signal, such as an FMCW signal, which is used for radar sensor applications as the transmitted signal is modulated in frequency, or phase. The FMCW signal enables a radar to measure range to a target by measuring the phase differences in phase or frequency between the transmitted signal and the received or reflected signal. Within FMCW formats, there are a variety of modulation patterns that may be used within FMCW, including sinusoidal, triangular, sawtooth, rectangular and so forth, each having advantages and purposes. For example, sawtooth modulation may be used for large distances to a target; a triangular modulation enables use of the Doppler frequency, and so forth.

Other modulation types may be incorporated according to the desired information and specifications of a system and application. For example, the transmission signal controller 210 may also generate a cellular modulated signal, such as an Orthogonal Frequency Division Multiplexed (OFDM) signal. In some examples, the signal is provided to the antenna module 200 and the transmission signal controller 210 may act as an interface, translator or modulation controller, or otherwise as required for the signal to propagate through a transmission line system. The received information is stored in a memory storage unit 212, wherein the information structure may be determined by the type or transmission and modulation pattern.

In various examples, the phase compensated MLMS antenna array 202 radiates the transmission signal through a structure that includes three main layers: power division layer 216, superelement antenna array layer 220 and a superstrate layer 224, interspersed by two adhesive layers 218 and 222. The power division layer 216 is a corporate feed structure having a plurality of transmission lines for transmitting the signal to superelement subarrays in the superelement antenna array layer 220. Each superelement subarray in the superelement antenna array layer 220 includes a plurality of radiating slots for radiating the transmission signal into the air. The slots are configured in a specific pattern as described below, but other patterns, shapes, dimensions, orientations and specifications may be used to achieve a variety of radiation patterns. The superstrate layer 224 is used to increase the efficiency and directivity of the phase compensated MLMS antenna array 202, and the adhesive layers 218 and 222 are made of adhesive material to adhere the layers 216, 220 and 224 together. The adhesive layers 218 and 222 may be, for example, preimpregnated ("prepreg") bonding sheets.

Although FIG. 2 depicts one phase compensated MLMS antenna array 202 in the MLMS antenna 200, the MLMS antenna 200 may have multiple phase compensated MLMS antenna arrays in any given configuration depending on implementation. A set of MLMS antennas may be configured to serve as transmit antennas, and another set of MLMS antennas may be configured to serve as receive antennas. In one or more implementations, an MLMS antenna in the phase compensated MLMS antenna array 202 may be orthogonal to another antenna in the phase compensated MLMS antenna array 202. Different MLMS antennas may also have different polarizations. In various examples, different MLMS antennas may be configured to detect different targets, e.g., a first set of antennas may be configured to enhance the detection and identification of pedestrians, a second set of antennas may be configured to enhance the detection and identification of vehicles, and so forth. In the case of pedestrians, the configuration of the MLMS antennas may include power amplifiers to adjust the power of a transmitted signal and/or apply different polarization modes for different arrays to enhance pedestrian detection. It is appreciated that numerous configurations of MLMS antennas may be implemented in a given antenna module.

In operation, the antenna controller 204 receives information from other modules in the antenna module 200 and/or from the perception module 104 of FIG. 1 indicating a next radiation beam, in which a radiation beam may be specified by parameters such as beam width, transmit angle, transmit direction and so forth. The antenna controller 204 determines a voltage matrix to apply to reactance control mechanisms in the phase compensated MLMS antenna array 202 to determine a given phase shift or other antenna parameters.

Transceiver 208 prepares a signal for transmission, such as a signal for a radar device, wherein the signal is defined by modulation and frequency. The signal is received by the phase compensated MLMS antenna array 202 and the desired phase of the radiated signal is adjusted at the direction of the antenna controller 204. In some examples, phase compensated MLMS antenna array 202 can be implemented in many applications, including radar, cellular antennas, and autonomous vehicles to detect and identify targets in the path of or surrounding the vehicle. Alternate examples may use the MLMS antenna for wireless communications, medical equipment, sensing, monitoring, and so forth. Each application type incorporates designs and configurations of the elements, structures and modules described herein to accommodate their needs and goals.

In the antenna module 200, a signal is specified by antenna controller 204, which may be at the direction of perception module (e.g., perception module 104 in FIG. 1), a sensor fusion module via interface-to-sensor fusion 214, or it may be based on program information from memory storage 212. There are a variety of considerations to determine the beam formation, wherein this information is provided to antenna controller 204 to configure the various elements of the phase compensated MLMS antenna array 202, which are described herein. The transmission signal controller 210 generates the transmission signal and provides it to the phase compensated MLMS antenna array 202, such as through a coaxial cable or other connector. The signal propagates through the power division layer 216 to the superelement antenna array layer 220 and superstrate layer 224 for transmission through the air.

The antenna structure of FIG. 2 may be referred to as a type of slotted wave guide antenna ("SWGA"), in which the power division layer 216 is configured to serve as a feed to the superelement antenna array layer 220. Alternate examples may reconfigure and/or modify the antenna structure to improve radiation patterns, bandwidth, side lobe levels, and so forth. The antenna performance may be adjusted by design of the antenna's features and materials, such as the shape of the slots, slot patterns, slot dimensions, conductive trace materials and patterns, as well as other modifications to achieve impedance matching and so forth.

Figure 3C:
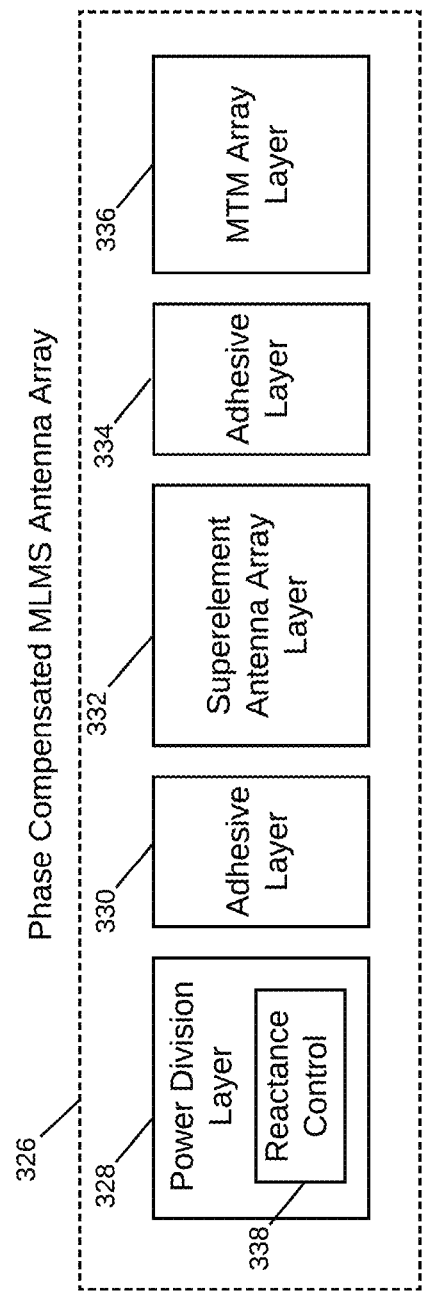

Attention is now directed to FIGS. 3A-C, which illustrate other examples of a phase compensated MLMS antenna array for use in the antenna module 200 of FIG. 2. In the example of FIG. 3A, a phase compensated MLMS antenna array 300 has a power division layer 302, a superelement antenna array layer 306 and a superstrate layer 310, with an adhesive layer 304 interspersed between the power division layer 302 and the superelement antenna array layer 306, and an adhesive layer 308 interspersed between the superelement antenna array layer 306 and the superstrate layer 310. The power division layer 302 includes reactance control module 312 for achieving different phase shifts in the radiated RF signals. The reactance control module 312 may include an RF integrated circuit having a varactor, a network of varactors, or a phase shift network to achieve phase shifts in a range of 0 degrees to 360 degrees and thereby enable full scanning of an entire FoV.

In the example of FIG. 3B, a phase compensated MLMS antenna array 314 includes a power division layer 316 and a superelement antenna array layer 320, similar to layers 302 and 306 of FIG. 3A, and interspersed by adhesive layers 304 and 308, similar to adhesive layers 304 and 308. However, the phase compensated MLMS antenna array 314 includes a metamaterial (MTM) array layer 324 in lieu of the superstrate layer 310, in which reactance control is provided within MTM cells in the MTM array layer 324. The MTM array layer 324 is composed of individual MTM cells, where each of the MTM cells has a uniform size and shape; however, some examples may incorporate different sizes, shapes, configurations and array sizes. Each MTM cell may include a conductive outer portion or loop surrounding a conductive area with a space in between. Each cell may be configured on a dielectric layer, with the conductive areas and loops provided around and between different cells. A voltage controlled variable reactance device embedded on each MTM cell, e.g., a varactor, provides a controlled reactance between the conductive area and the conductive loop. The controlled reactance is controlled by an applied voltage, such as an applied reverse bias voltage in the case of a varactor. The change in reactance changes the behavior of the MTM cell, enabling the MTM array layer 324 to provide focused, high gain beams directed to a specific location.

As generally described herein, an MTM cell is an artificially structured element used to control and manipulate physical phenomena, such as the Electromagnetic (EM) properties of a signal including its amplitude, phase, and wavelength. Metamaterial structures behave as derived from inherent properties of their constituent materials, as well as from the geometrical arrangement of these materials with size and spacing that are much smaller relative to the scale of spatial variation of typical applications. A metamaterial is not a tangible material, but rather is a geometric design of known materials, such as conductors, that behave in a specific way. An MTM cell may be composed of multiple microstrips, gaps, patches, vias, and so forth having a behavior that is the equivalent to a reactance element, such as a combination of series capacitors and shunt inductors. Various configurations, shapes, designs and dimensions are used to implement specific designs and meet specific constraints. In some examples, the number of dimensional freedom determines the characteristics, wherein a device having a number of edges and discontinuities may model a specific-type of electrical circuit and behave in a similar manner. In this way, an MTM cell radiates according to its configuration. Changes to the reactance parameters of the MTM cell result in changes to its radiation pattern. Where the radiation pattern is changed to achieve a phase change or phase shift, the resultant structure is a powerful antenna or radar, as small changes to the MTM cell can result in large changes to the beamform.

The MTM cells include a variety of conductive structures and patterns, such that a received transmission signal is radiated therefrom. In various examples, each MTM cell has some unique properties. These properties may include a negative permittivity and permeability resulting in a negative refractive index; these structures are commonly referred to as left-handed materials (LHM). The use of LHM enables behavior not achieved in classical structures and materials, including interesting effects that may be observed in the propagation of electromagnetic waves, or transmission signals. Metamaterials can be used for several interesting devices in microwave and terahertz engineering such as antennas, sensors, matching networks, and reflectors, such as in telecommunications, automotive and vehicular, robotic, biomedical, satellite and other applications. For antennas, metamaterials may be built at scales much smaller than the wavelengths of transmission signals radiated by the metamaterial. Metamaterial properties come from the engineered and designed structures rather than from the base material forming the structures. Precise shape, dimensions, geometry, size, orientation, arrangement and so forth result in the smart properties capable of manipulating EM waves by blocking, absorbing, enhancing, or bending waves.

In FIG. 3C, a phase compensated MLMS antenna array 326 includes a power division layer 328, a superelement antenna array layer 332 and an MTM array layer 336, with an adhesive layer 330 interspersed between the power division layer 328 and the superelement antenna array layer 332, and an adhesive layer 334 interspersed between the superelement antenna array layer 332 and the MTM array layer 336. The power division layer 328 includes a reactance control module 338. The phase compensated MLMS antenna array 326 enables reactance control through the reactance control module 338 in the power division layer 328 as well as through reactance control devices in each MTM cell of the MTM array layer 336. In some aspects, the superelement antenna array layer 332 is similar to the superelement antenna arrays 306 and 320 of FIGS. 3A and 3B, respectively. As described in more detail below, each power division layer and superelement antenna array layer of the phase compensated MLMS antenna arrays 202, 300, 314 and 326 may have multiple conductive layers (e.g., copper layers) surrounding a dielectric layer therebetween.

Figure 4:
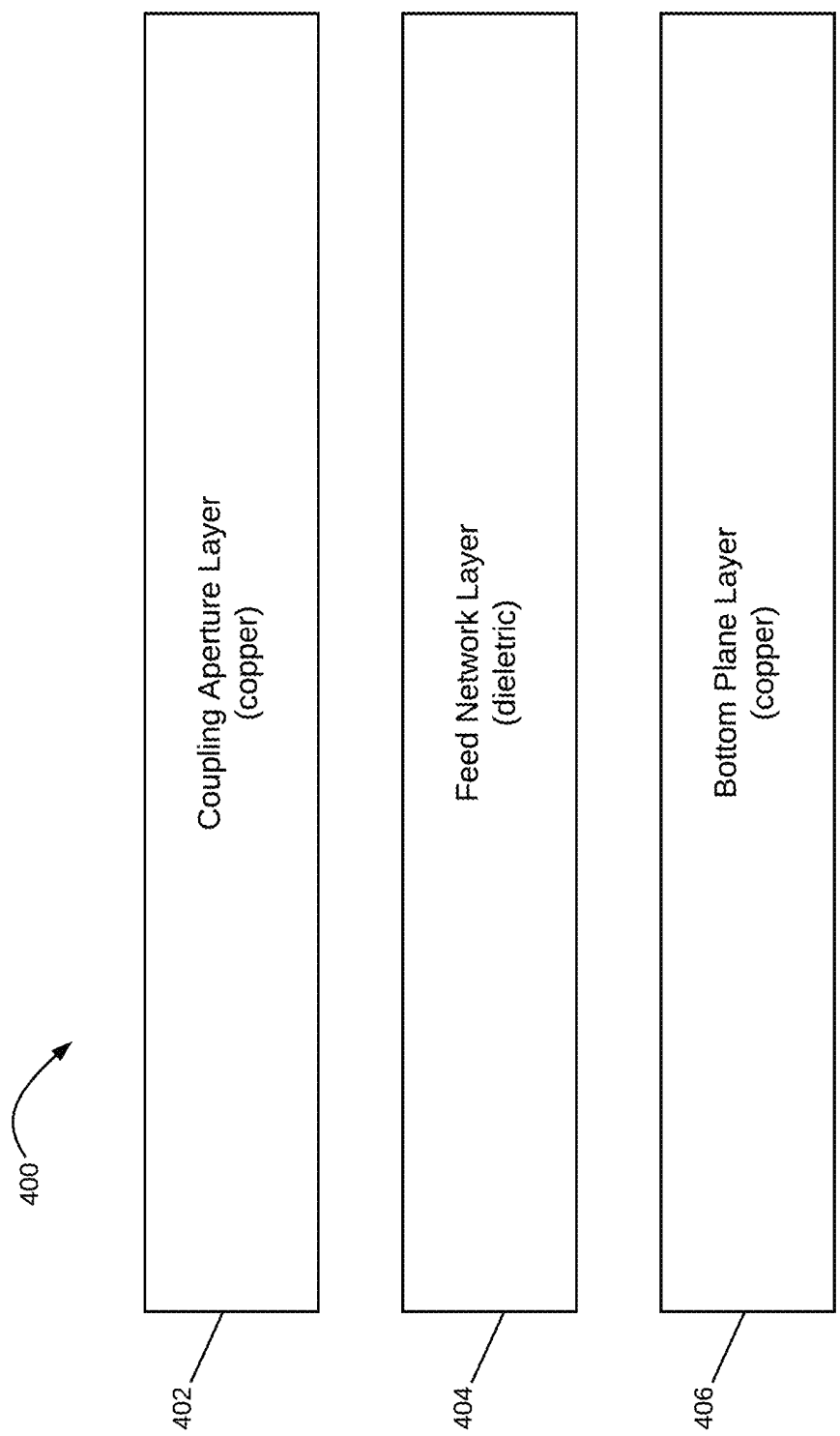
FIG. 4 conceptually illustrates a power division layer for use with a phase compensated MLMS antenna array in accordance with some implementations of the subject technology.

FIG. 4 conceptually illustrates a power division layer 400 for use with a phase compensated MLMS antenna array in accordance with some implementations of the subject technology. In some implementations, the power division layer 400 includes a coupling aperture layer 402, a feed network layer 404 and a bottom plane layer 406. In some implementations, the power division layer 400 includes a dielectric layer interposed between two conductive layers, where the coupling aperture layer 402 and the bottom plane layer 406 correspond to the two conductive layers and the feed network layer 404 corresponds to the dielectric layer. In this respect, the coupling aperture layer 402 is disposed on the feed network layer 404, and the feed network layer 404 is disposed on the bottom plane layer 406. In some aspects, the bottom plane layer 406 includes a metallic material, such as copper, and has a connector and a line of vias arranged in parallel for connecting the transmission signal to the phase compensated MLMS antenna array (e.g., 326). The coupling aperture layer 402 has a plurality of coupling apertures for effectively feeding signals from the feed network layer 404 into the superelements in the superelement antenna array layer (e.g., 332). Although FIG. 4 depicts two conductive layers and one dielectric layer, the number conductive layers and dielectric layers may vary depending on implementation without departing from the scope of the present disclosure.

Figure 5:
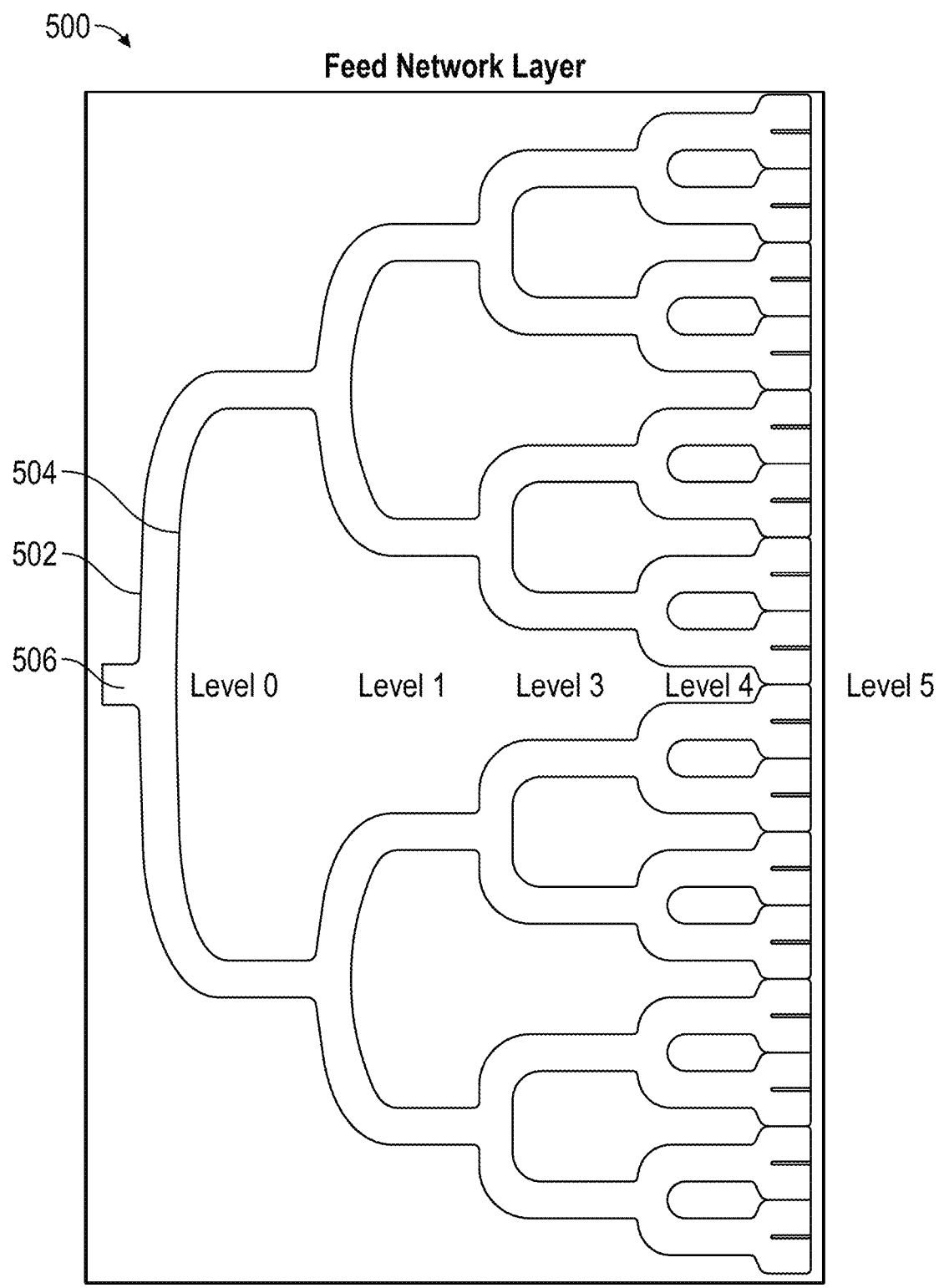
FIG. 5 illustrates a feed network layer for use in the power division layer of FIG. 4 in accordance with some implementations of the subject technology.

FIG. 5 illustrates a feed network layer 500 for use in the power division layer 400 of FIG. 4 in accordance with some implementations of the subject technology. The feed network layer 500 provides a corporate feed dividing the transmission signal received from a transmission signal controller (e.g., transmission signal controller 210 of FIG. 2) for propagation to the superelement antenna array layer (e.g., 220, 306, 320, 332). In the illustrated example, the feed network layer 500 is a type of a power divider circuit such that it takes an input signal and divides it through a network of paths or transmission lines.

Within the feed network layer 500 is a network of paths, in which each of the division points is identified according to a division level. As depicted in FIG. 5, the feed network layer 500 includes a first level of transmission lines (depicted as LEVEL 0), a second level of transmission lines (depicted as LEVEL 1), a third level of transmission lines (depicted as LEVEL 2), a fourth level of transmission lines (depicted as LEVEL 3), and a fifth level of transmission lines (depicted as LEVEL 4). Each level in the feed network layer 500 doubles its paths: LEVEL 1 has 2 paths, LEVEL 2 has 4 paths, LEVEL 3 has 8 paths, LEVEL 4 has 16 paths, and LEVEL 5 has 32 paths. The distance between two paths originating from a common division point may be fixed for other paths on a same level, but the distance between paths on other levels may be different. For example, the transmission lines split off from a common division point on LEVEL 1 may be separated by a first distance (depicted as 2a), whereas, the transmission lines split off from a common division point on LEVEL 2 may be separated by a second distance (depicted as 4*a*), which is greater than the first distance (or 2*a*). In another example, the transmission lines split off from a common division point on LEVEL 3 may be separated by a third distance (depicted as 8*a*) that is greater than the second distance (or 4*a*), whereas the transmission lines split off from a common division point on LEVEL 4 may be separated by a fourth distance (depicted as 16*a*), which is greater than the third distance (or 8*a*). In this implementation, the paths have similar dimensions; however, the size of the paths may be configured differently to achieve a desired transmission and/or radiation result. The transmission lines of the feed network layer 500 may reside in a substrate of the phase compensated MLMS antenna array (e.g., 202, 300, 314, 326).

In some implementations, the feed network layer 500 is impedance-matched, such that the impedances at each end of a transmission line matches the characteristic impedance of the line. Each transmission line may be bounded by a set of vias, such as vias 502 and 504. In some implementations, matching vias, e.g., via 506 are also provided for better impedance matching and phase control.

Figure 6:
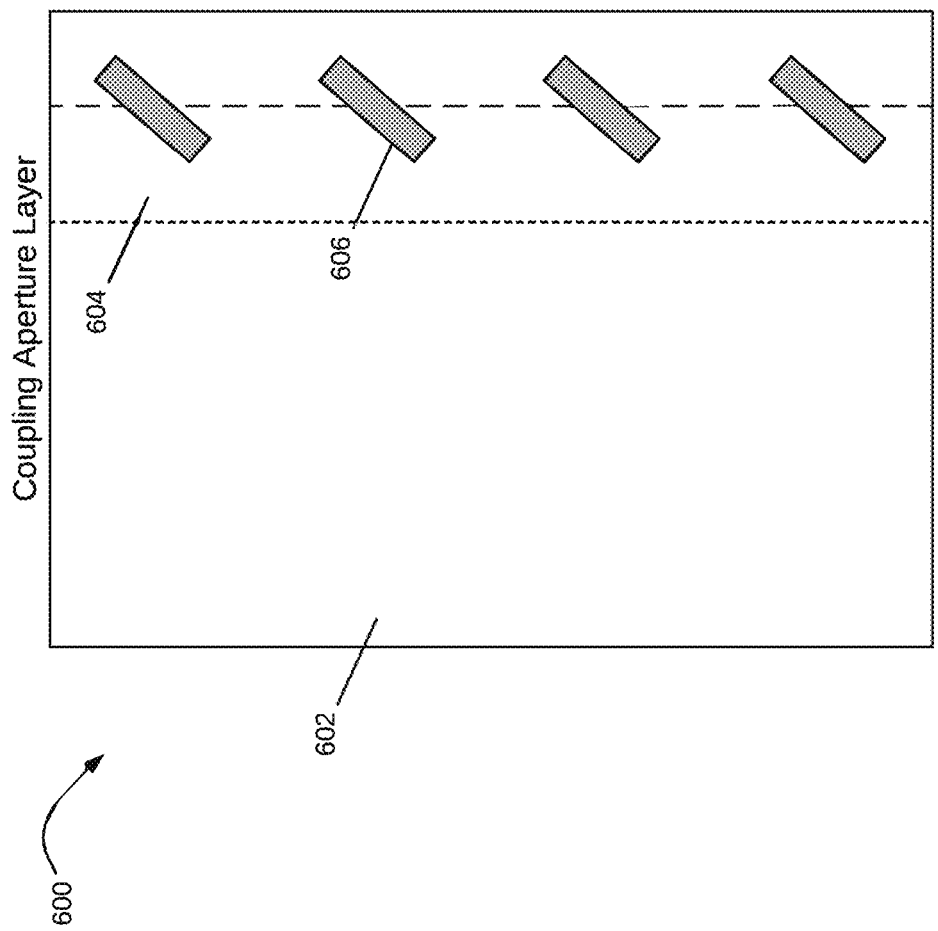
FIG. 6 illustrates a coupling aperture layer for use in the power division layer of FIG. 4 in accordance with some implementations of the subject technology.

FIG. 6 illustrates a coupling aperture layer 600 for use in the power division layer 400 of FIG. 4 in accordance with some implementations of the subject technology. The coupling aperture layer 600 includes multiple apertures 606 for coupling the transmission signals from feed network layer 404 to the superelements in a superelement antenna array of an MLMS antenna, e.g., the superelement antenna array 220 in the phase compensated MLMS antenna array 202 of FIG. 2. The coupling aperture layer 600 is a conductive layer having two sections, namely a section 602 and a section 604. Section 604 includes the coupling apertures 606 oriented at a non-orthogonal angle about a centerline, while section 602 is a contiguous portion of copper material. Each of the coupling apertures 606 can provide a transmission signal to corresponding radiating slots in the superelements.

Figure 7:
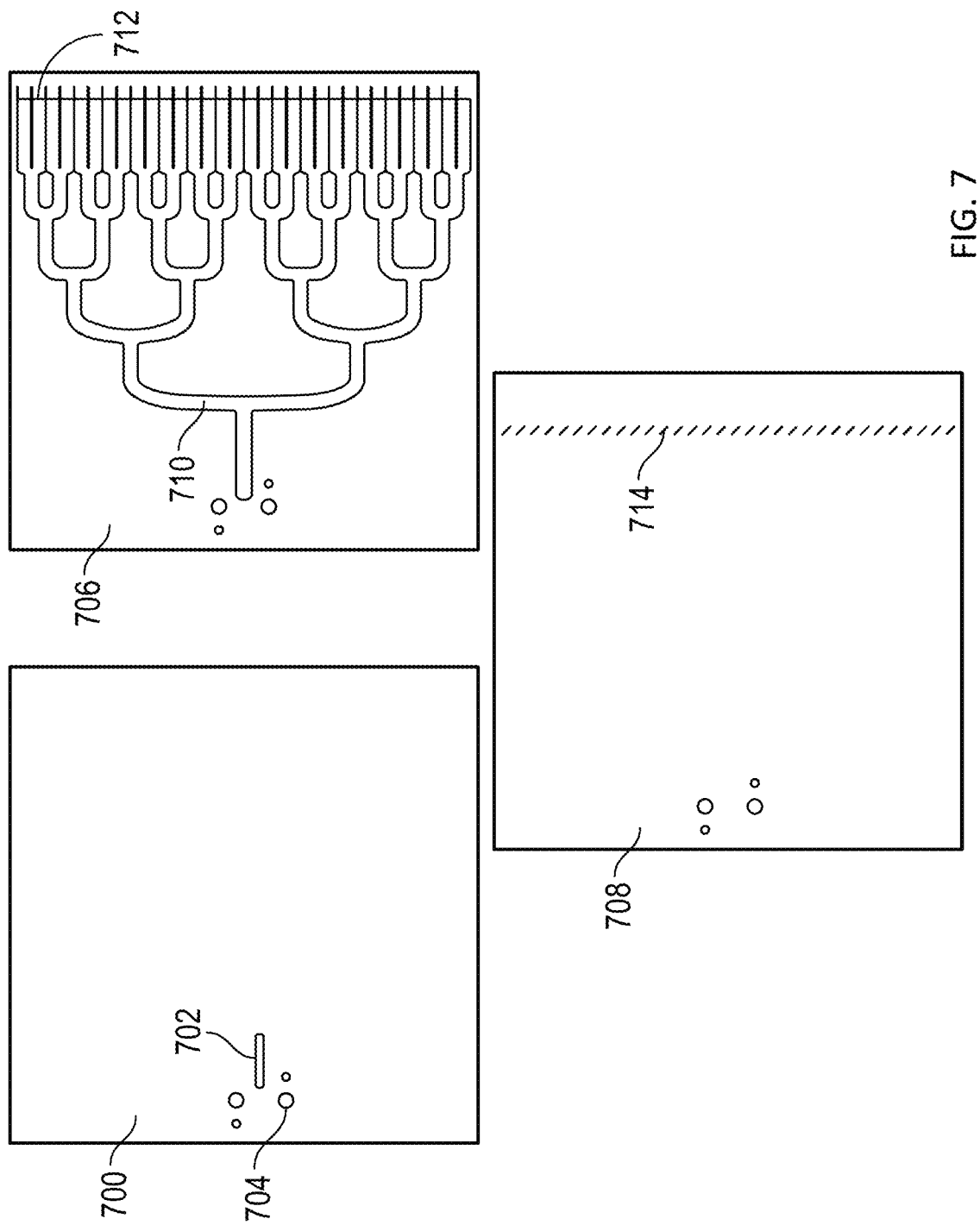
FIG. 7 illustrates a schematic diagram illustrating individual layers in a power division layer in accordance with some implementations of the subject technology.

FIG. 7 illustrates a schematic diagram illustrating individual layers of a power division layer in accordance with some implementations of the subject technology. The power division layer as depicted in FIG. 7 includes a bottom plane layer 700, a feed network layer 706 and a coupling aperture layer 708. The bottom plane layer 700 is, or includes at least a portion of, the bottom plane layer 406 of FIG. 4. The bottom plane layer 700 includes multiple vias arranged in parallel, namely vias 702, and openings 704 for inserting a connector to a Printed Circuit Board (PCB) for the MLMS antenna. The connector can couple the transmission signal from the transmission signal controller 210 to the PCB for transmission through the feed network layer 706 and the coupling aperture layer 708. The feed network layer 706 is depicted with a corporate feed network 710 for dividing the transmission signal while achieving impedance matching on the transmission line paths. The corporate feed network 710 fans out transmission line paths along a first axis, and the corporate feed network 710 has a number of path levels that increases along a second axis orthogonal to the first axis. The corporate feed network 710 includes a set of termination vias 712 arranged along the first axis for coupling the transmission signals from the feed network layer 706 to the coupling aperture layer 708. The coupling aperture layer 708 includes a set of coupling slots 714 oriented at a non-orthogonal angle (e.g., 45°) relative to a centerline that runs along the first axis.

Figure 8:
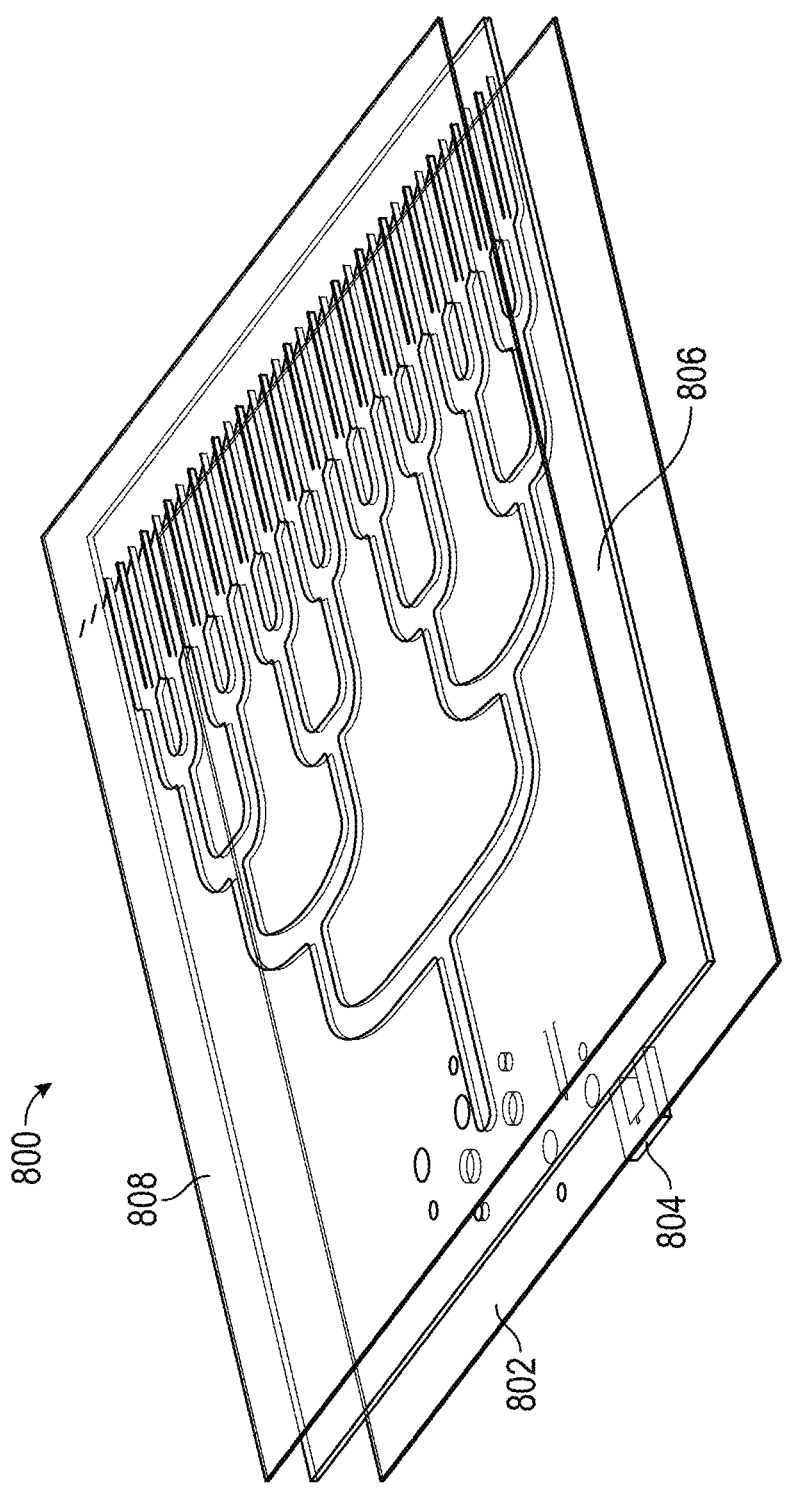
FIG. 8 illustrates an exploded perspective view of the individual layers of FIG. 7 in accordance with some implementations of the subject technology.

FIG. 8 illustrates an exploded perspective view of the individual layers of FIG. 7 in a power division layer 800 in accordance with some implementations of the subject technology. The individual layers of the power division layer 800 that are illustrated include a bottom plane layer 802, a feed network layer 806, and a coupling aperture layer 808, which may respectively correspond to the bottom plane layer 700, the feed network layer 706 and the coupling aperture layer 706 of FIG. 7. The bottom plane layer 802 may include, or be coupled to, a connector 804. In some implementations, one or more of the layers in the power division layer 800 may include a substrate formed of a polytetrafluoroethylene material having predetermined parameters (e.g., low dielectric loss) that are applicable to high frequency circuits. In some aspects, a polytetrafluoroethylene substrate can exhibit thermal and phase stability across temperature and can be used in automotive radar and microwave applications.

Figure 9:
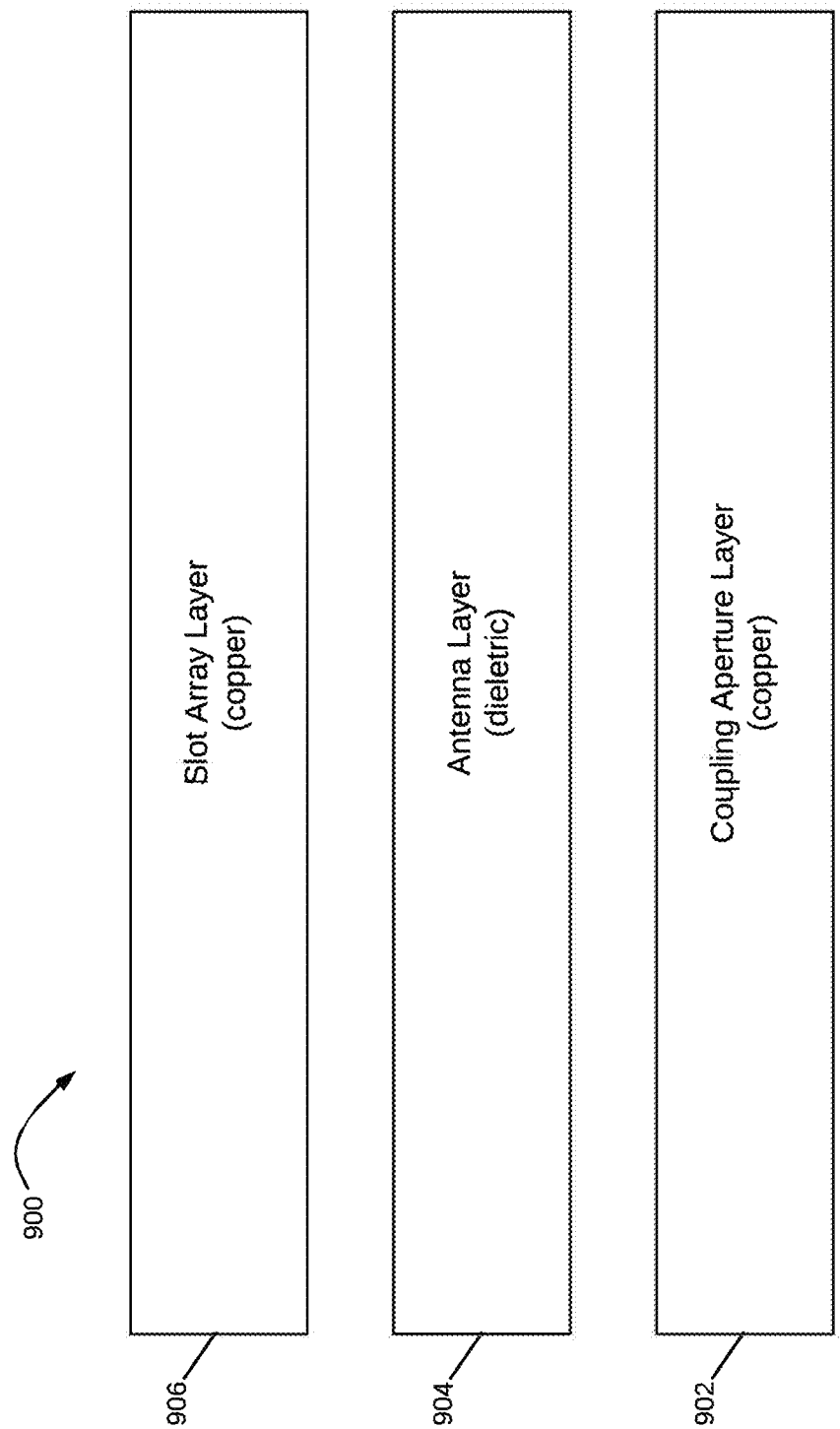
FIG. 9 conceptually illustrates a superelement antenna array layer for use with a phase compensated MLMS antenna array in accordance with some implementations of the subject technology.

FIG. 9 conceptually illustrates a superelement antenna array layer 900 for use with a phase compensated MLMS antenna array in accordance with some implementations of the subject technology. In some implementations, the superelement antenna array layer 900 includes a coupling aperture layer 902, an antenna layer 904 and a slot array layer 906. In some implementations, the superelement antenna array layer 900 includes a dielectric layer interposed between two conductive layers, where the coupling aperture layer 902 and the slot array layer 906 correspond to the two conductive layers and the antenna layer 904 corresponds to the dielectric layer. In this respect, the slot array layer 906 is disposed on the antenna layer 904, and the antenna layer 904 is disposed on the coupling aperture layer 902. In some aspects, each of the coupling aperture layer 902 and the slot array layer 906 includes a metallic material, such as copper. The coupling aperture layer 902 is similar to the coupling aperture layer 402 of FIG. 4 and the coupling aperture layer 600 of FIG. 6. The antenna layer 904 includes a dielectric material and has an array of transmission lines as will be described in further detail in FIG. 10. The slot array layer 906 includes an array of slots as will be described in further detail in FIG. 11. The array of transmission lines in the antenna layer 904 in conjunction with the array of slots in the slot array layer 906 can form an array of superelements. Each superelement in the array of superelements can provide RF signals at a predetermined phase.

FIG. 10 illustrates an antenna layer 1000 for use with the superelement antenna array layer 900 of FIG. 9 in accordance with some implementations of the subject technology. The antenna layer 1000 is depicted with an array of transmission lines, where the antenna layer 1000 is segmented into multiple elements such that each element corresponds to a transmission line. In some implementations, each of the elements includes a set of parallel vias on opposing sides of element and a set of termination vias on opposing ends of the element. For example, the antenna layer 1000 includes element 1002 that includes a set of first vias 1004 arranged along a length of the element 1002 on a periphery of a first side of element 1002 and a set of first vias 1006 arranged in parallel to the set of first vias 1004 on a periphery of a second side of the element 1002. The element 1002 also includes a set of second vias 1008 arranged orthogonal to the set of first vias (e.g., 1004, 1006) and proximate to a first end of the element 1002, and a set of second vias 1010 arranged proximate to a second end of the element 1002, which serve as the termination vias.

There may be any number of elements in the antenna layer 1000 depending on implementation, such as 8, 16, 32 and so on. In some implementations, the antenna layer 1000, a feed network layer (e.g., 500) and a slot array layer (e.g., 906) have a corresponding number of elements. For example, if the feed network layer has 5 levels with 32 paths for 32 transmission signals, then the antenna layer 1000 can have 32 elements in its array of transmission lines to feed into 32 slot elements of the slot array layer. Although FIG. 10 depicts the antenna layer 1000 with a certain configuration and arrangement of elements and vias, the configuration and arrangement of such features can vary depending on implementation without departing from the scope of the present disclosure.

Figure 11A:
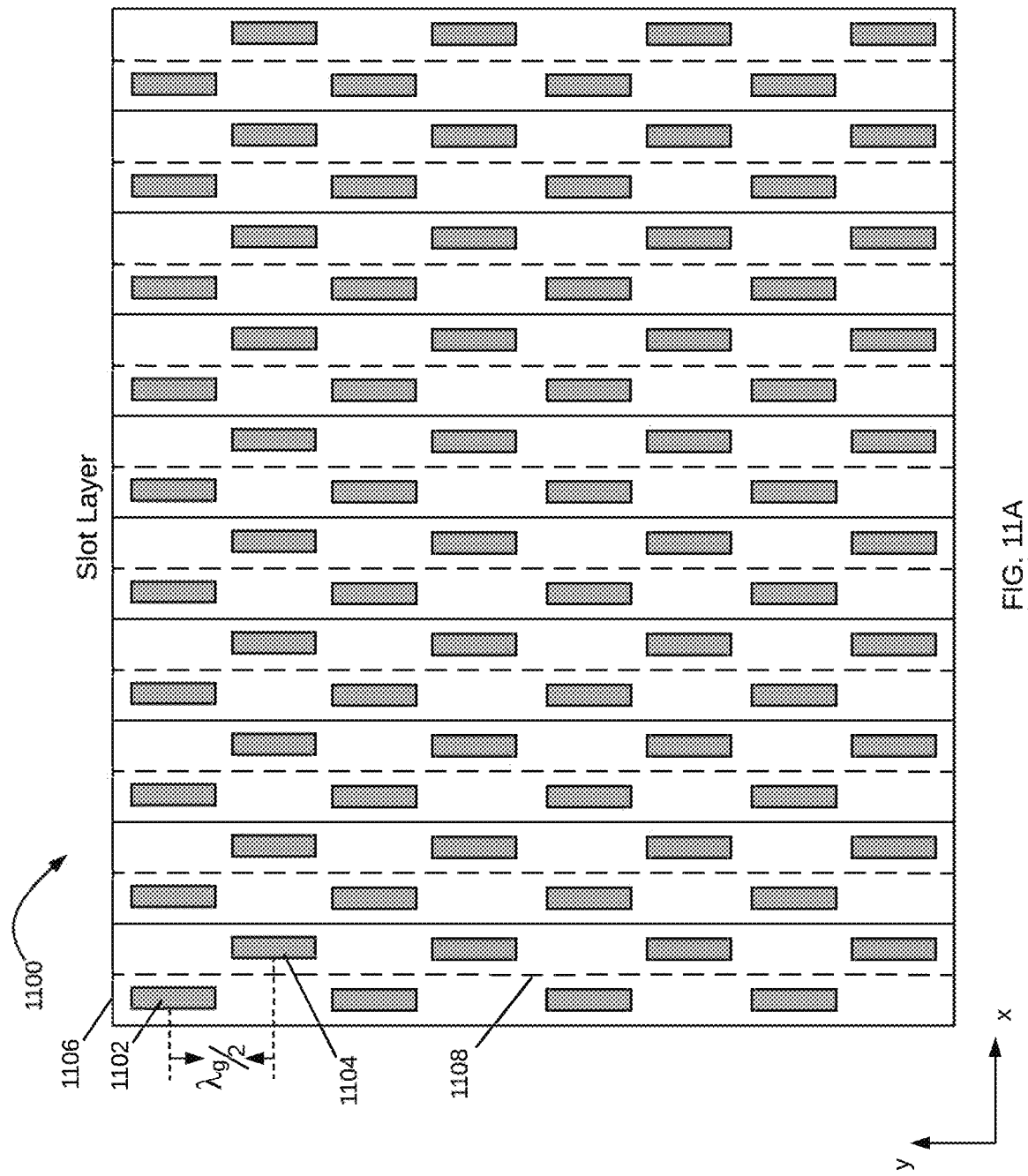
FIG. 11A illustrates an example of a slot array layer for use with the superelement antenna array layer of FIG. 9 in accordance with some implementations of the subject technology.

FIG. 11A illustrates an example of a slot array layer 1100 for use with the superelement antenna array layer 900 of FIG. 9 in accordance with some implementations of the subject technology. The slot array layer 1100 includes an array of elements, where each element of the array of elements has multiple slots (or openings) penetrating through the slot array layer 1100 along a top surface of the slot array layer 1100. In some implementations, the slots in each element are equidistant to a center line (depicted as a dashed line) and are staggered from other slots across the center line along a length of the element. For example, the slot array layer 1100 includes an element 1106 having slots 1102 and 1104 that are equidistant from center line 1108.

Each element in the slot array layer 1100 together with a corresponding element in the antenna layer 1000 of FIG. 10 can form a superelement. In some implementations, the superelements represent waveguides, which may be bounded by conductive vias along the periphery of each side and by a ground at each (or either) opposing end of the layer. The distance between the center of a first slot (e.g., slot 1102) in an element (e.g., 1106) of the slot array layer 1100 and the center of an adjacent equidistant slot (e.g., 1104) is depicted as $\lambda_g/2$, where $\lambda_g$ is the guide wavelength. In some examples, the slot array layer 1100 has a 32×8 configuration, where the slot array layer 1100 includes 32 elements with 8 slots in each element.

By having the slots of a superelement (e.g., the slots 1102 and 1104) separated by a distance of $\lambda_g/2$ can cause the slots to radiate at a same phase and produce a broadside main beam. In order to achieve phase control in multiple directions (e.g., both x and y directions) for radiated beams, a phase compensated MLMS antenna array can include reactance control in either or both of the power division layer and MTM array layer, such as the power division layer 328 and MTM array layer 336 of the phase compensated MLMS antenna array 326 of FIG. 3C. In some implementations, the phase control in at least one direction (e.g., the y direction) can be provided by phase compensation in a slot array layer, as will be discussed in further detail in FIG. 11B.

Figure 11B:
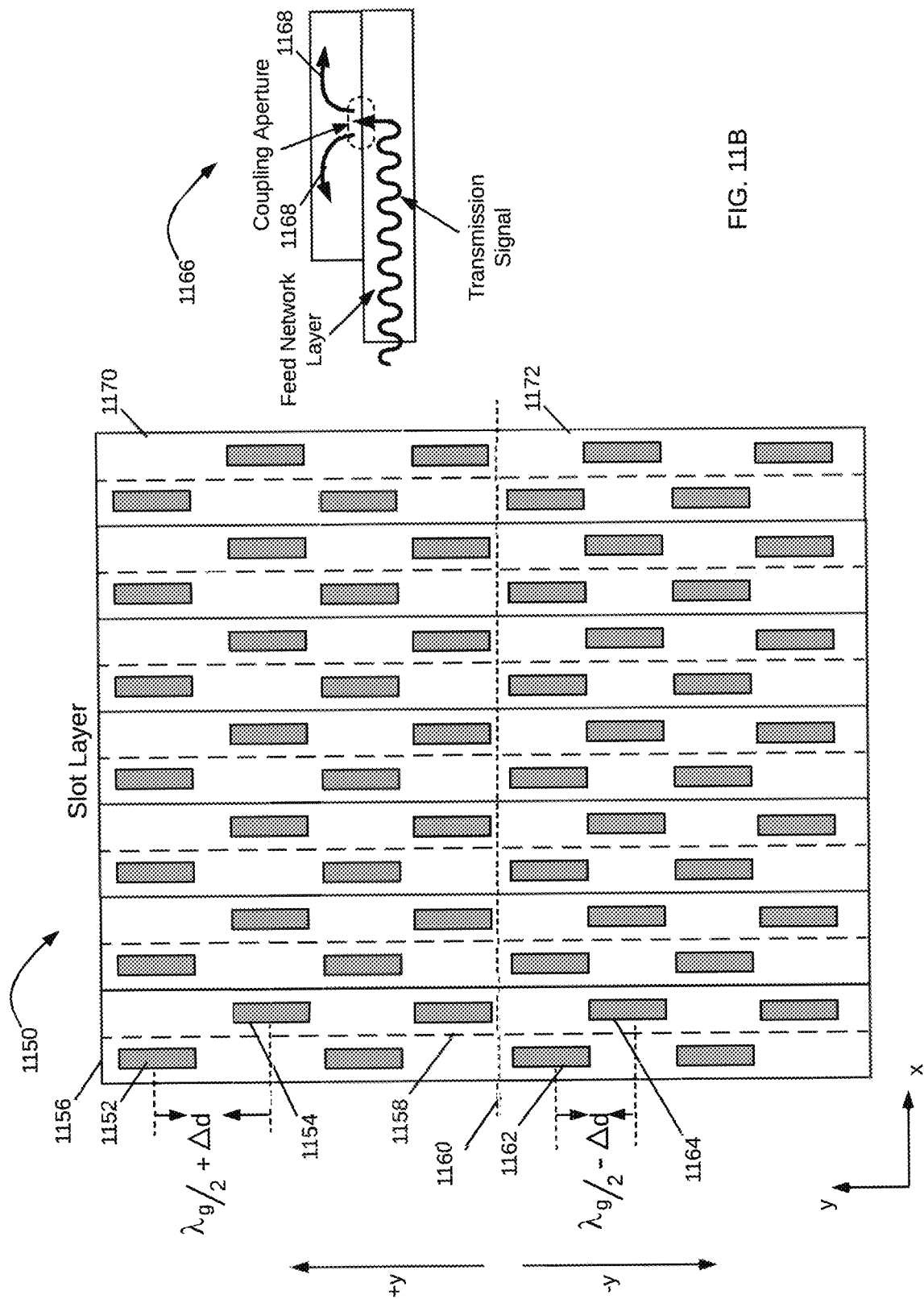
FIG. 11B illustrates another example of a slot array layer providing phase compensation for use with the superelement array layer of FIG. 9 in accordance with some implementations of the subject technology.

FIG. 11B illustrates another example of a slot array layer 1150 providing phase compensation for use with the superelement array layer 900 of FIG. 9. The slot array layer 1150 includes an array of elements, where each element of the array of elements has multiple slots (or openings) penetrating through the slot array layer 1150 along a top surface of the slot array layer 1100. The slot array layer 1150 includes a first region 1170 and a second region 1172 with a boundary line 1160 defining a boundary between the first region 1170 and the second region 1172. As used herein, the term "phase compensated slot" refers to slots that are phase compensated based on their distance relative to other slots within a region of a slot array layer. In some implementations, the phase compensated slots in each element are equidistant to a center line 1158 (depicted as a dashed line that is orthogonal to the boundary line 1160) and are staggered from other phase compensated slots across the center line 1158 along a length of the element. For example, the slot array layer 1150 includes an element 1156 having slots 1152 and 1154 that are equidistant from center line 1158. Each element in the slot array layer 1150 together with a corresponding element in the antenna layer 1000 of FIG. 10 can form a superelement.

In some implementations, the slots in the slot array layer 1150 are separated by different distances and phase compensated with different phases based at least on which of the first region 1170 and the second region 1172 of the slot array layer 1150 the slots are positioned. In the first region 1170, the phase compensated slots, such as slots 1152 and 1154, are distanced by $\lambda_g/2+\Delta d$, where $\lambda_g$ is the guide wavelength and $\Delta d$ is a distance offset that is added to the staggered slot distance (e.g., $\lambda_g/2$) along the y-direction to provide the same orientation in the beams radiating from the slot array layer 1150. In the second region 1172, the phase compensated slots, such as slots 1162 and 1164, are distanced by $\lambda_g/2-\Delta d$, where the $\Delta d$ is the distance offset that is subtracted from the staggered slot distance (e.g., $\lambda_g/2$) along the y-direction. In this respect, the slots in the first region 1170 of the slot array layer 1150 provide for steering in a positive elevation direction (depicted as +y axis), while the slots in the second region 1172 of the slot array layer 1150 provide for steering in a negative elevation direction relative to the boundary line 1162 (depicted as −y axis).

Also illustrated in FIG. 11B is a cross-sectional view 1166 of a coupling aperture layer of a power division layer that is disposed on a feed network layer of the power division layer. The cross-sectional view 1166 shows how a transmission signal can propagate through the feed network layer and radiate through a coupling aperture of the coupling aperture layer using multiple transmission signals 1168 to each superelement of a superelement antenna array layer. Referring back to the slot array layer 1150, the distance offsets and corresponding phases for each designated region (e.g., regions 1170, 1172) of the slot array layer 1150 may be determined from how the transmission signal is propagated through the feed network layer, divided into the transmission signals 1168 by the coupling aperture, and fed into multiple directions (including opposing directions) in the coupling aperture layer, to the superelements of the superelement antenna array layer. In this respect, the antenna array can radiate RF beams at a predetermined phase shift provided by one or more of reactance control mechanisms in the power division layer (e.g., 400 of FIG. 4), and/or the MTM array layer (e.g., 324, 336 of FIG. 3) and phase compensation in the slot array layer 1150.

FIG. 12 illustrates a schematic diagram illustrating individual layers in a superelement antenna array layer (e.g., the superelement antenna array layer 900 of FIG. 9) in accordance with some implementations of the subject technology. The superelement antenna array layer as depicted in FIG. 12 includes a coupling aperture layer 1200, an antenna layer 1204 and a slot array layer 1204. The coupling aperture layer 1200 includes a set of coupling slots 1210 oriented at a non-orthogonal angle (e.g., 45°) relative to a centerline that runs along a first axis. The antenna layer 1204 includes an array of elements 1212, where each element of the array of elements 1212 includes a set of parallel vias on opposing sides of element and a set of termination vias on opposing ends of the element. The array of elements 1212 may be disposed on at least a portion of the antenna layer 1204 (e.g., proximate to an edge of the antenna layer 1204). The slot array layer 1204 includes an array of elements 1214, where each element of the array of elements 1214 has multiple slots (or openings) penetrating through the slot array layer 1204. In some aspects, the slot array layer 1204 is disposed on the antenna layer 1202 such that each element in the slot array layer 1204 is superimposed over a corresponding element in the antenna layer 1202 to form a superelement.

Figure 13:
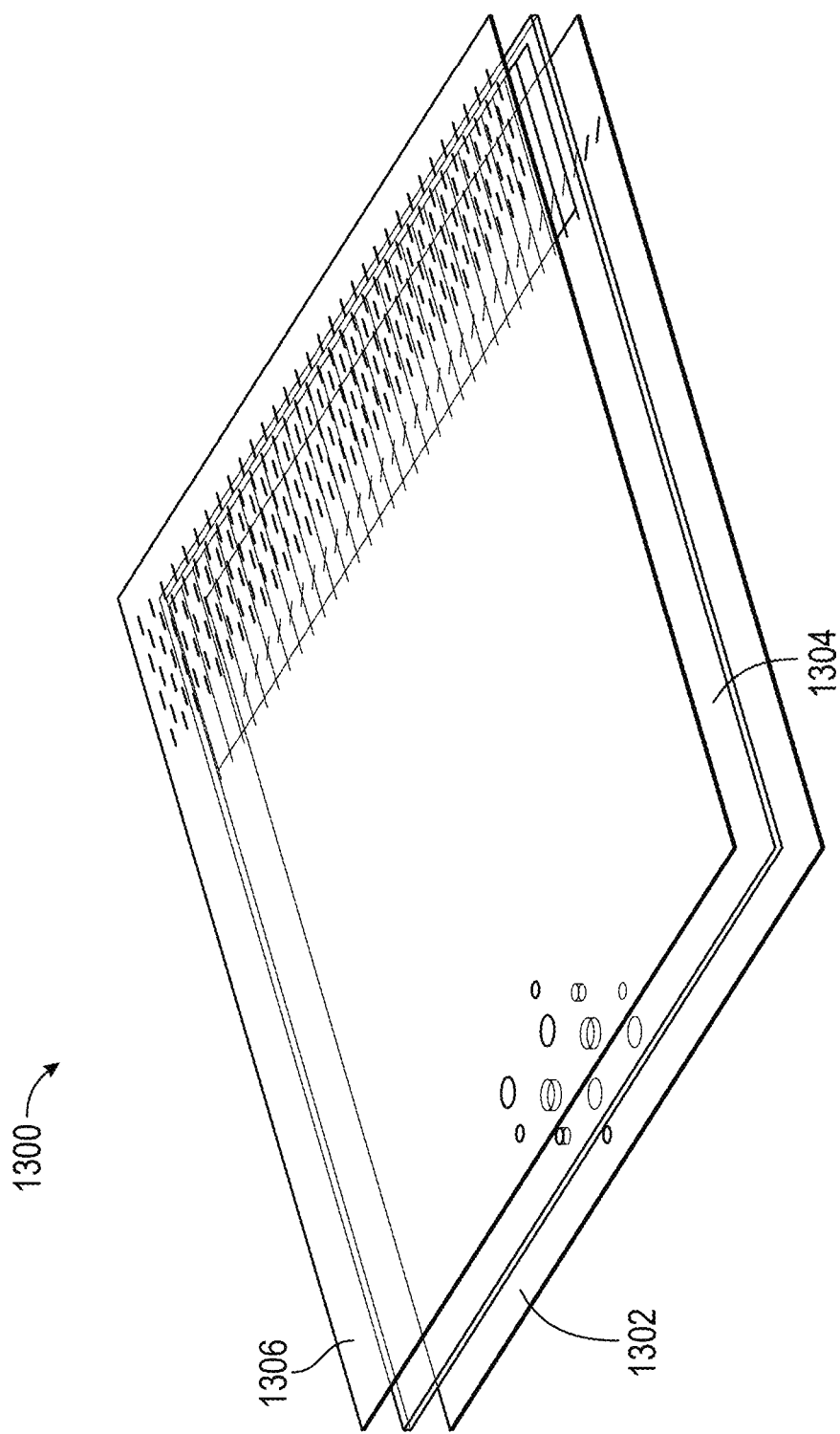
FIG. 13 illustrates an exploded perspective view of the individual layers of FIG. 12 in accordance with some implementations of the subject technology.

FIG. 13 illustrates an exploded perspective view of the individual layers of FIG. 12 in accordance with some implementations of the subject technology. The individual layers of a superelement antenna array layer 1300 that are illustrated include a coupling aperture layer 1302, an antenna layer 1304 and a slot array layer 1306, which may respectively correspond to the coupling aperture layer 1200, the antenna layer 1202 and the slot array layer 1204 of FIG. 12.

Figure 14A:
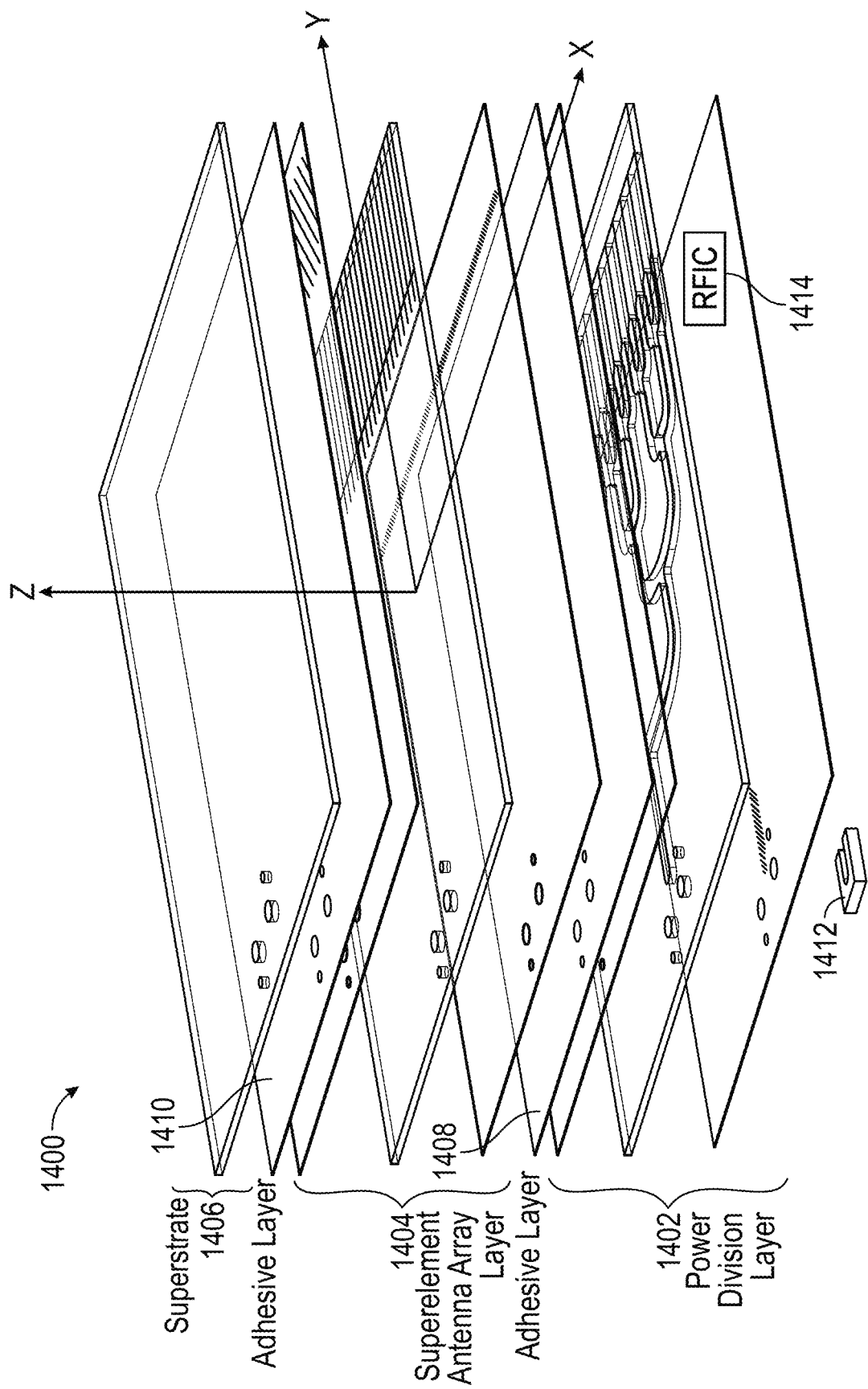
FIGS. 14A-C illustrate exploded perspective views of example configurations of phase compensated MLMS antenna arrays in accordance with some implementations of the subject technology.
Figure 14B:
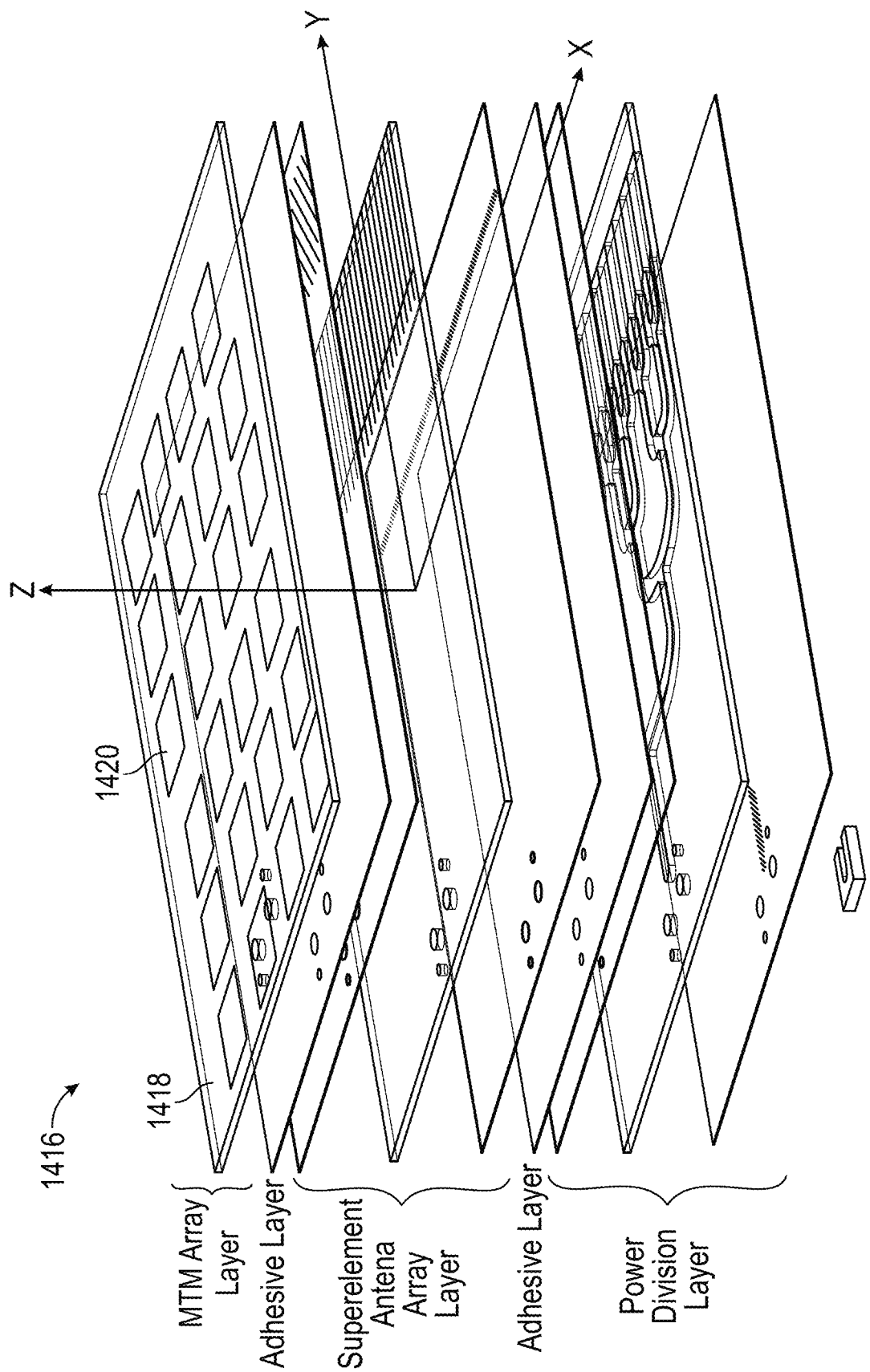
Figure 14C:
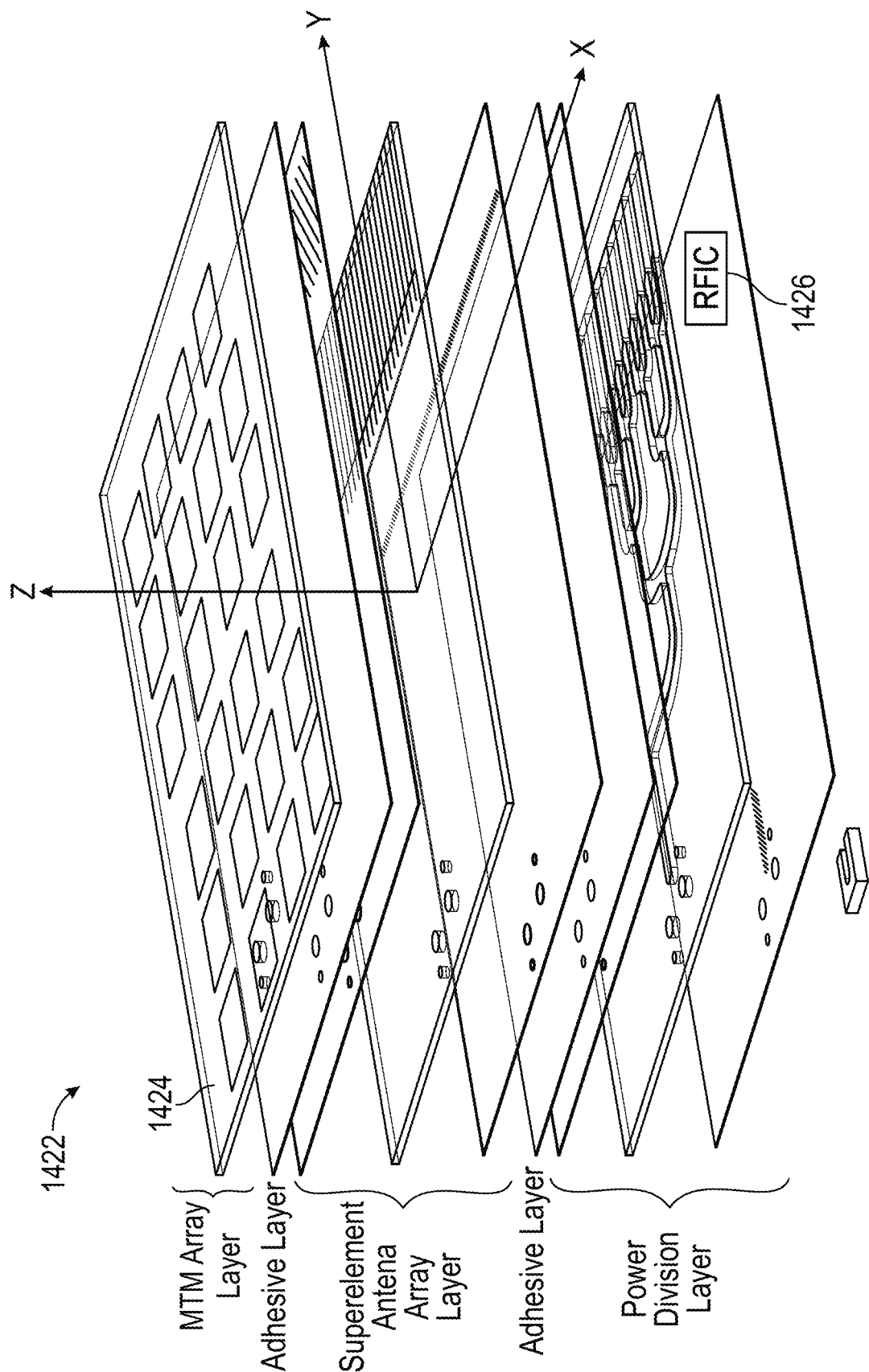

FIGS. 14A-C illustrate exploded perspective views of example configurations of phase compensated MLMS antenna arrays in accordance with some implementations of the subject technology. In FIG. 14A, an MLMS antenna 1400 is, or includes at least a portion of, the phase compensated MLMS antenna array 202 of FIG. 2. The phase compensated MLMS antenna array 1400 is shown oriented with the x-y-z axis as illustrated. The MLMS antenna 1400 includes a power division layer 1402, a superelement antenna array layer 1404 and a superstrate layer 1406. A first adhesive layer 1408 is interposed between the power division layer 1402 and the superelement antenna array layer 1404, and a second adhesive layer 1410 is interposed between the superelement antenna array 1404 and the superstrate layer 1406. The power division layer 1402 is similar to the power division layer 800, and the superelement antenna array layer 1404 is similar to the superelement antenna array layer 1300. In some aspects, the superstrate layer 1406 includes one or more superstrates.

Each of the power division layer 1402 and the superelement antenna array layer 1404 includes a dielectric layer interposed between two conductive layers. In some aspects, each of the conductive layers and the dielectric layer has a predetermined thickness (e.g., 20 mm for the dielectric layer thickness). The adhesive layers 1408 and 1410 may have a thickness in a range of 1 mm to 3 mm.

The MLMS antenna 1400 includes an RF Integrated Circuit (RFIC) 1414 that provides a reactance control with a varactor, a set of varactors, a phase shift network, or other mechanisms without departing from the scope of the present disclosure. The MLMS antenna 1400 may include multiple RFICs embedded into a ground plane layer of the power division layer 1402, such as to correspond to the number of path levels in a feed network layer of the power division layer 1402 or to the number of elements in the superelement antenna array layer 1404.

In the example of FIG. 14B, a phase compensated MLMS antenna array 1416 includes an MTM array layer 1418 with an array of MTM cells in lieu of a superstrate layer. Each MTM cell, e.g., MTM cell 1420, has a reactance control mechanism that enables the MTM cell to radiate an RF signal with a predetermined phase. The reactance control mechanism may also be in the form of a varactor or a set of varactors.

In the example of FIG. 14C, a phase compensated MLMS antenna array 1422 has reactance control provided in an MTM layer 1424 and by an RFIC 1426. As depicted in FIG. 14C, the MTM layer 1424 is implemented in lieu of a superstrate layer, and the power divisional layer (e.g., 1402) includes the RFIC 1426. Note that the layers in the phase compensated MLMS antenna arrays 1400, 1416 and 1422 have the same orientation in the x-y-z plane.

Figure 15:
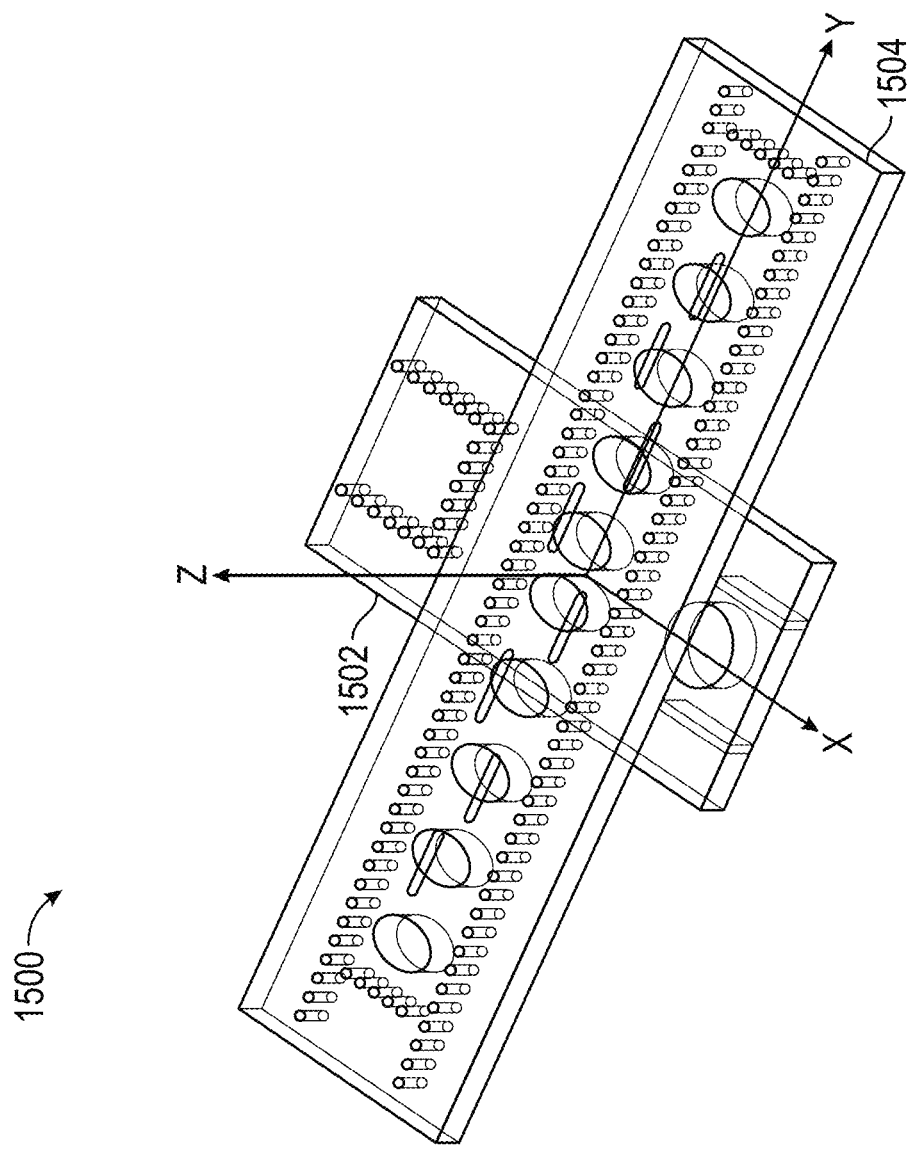
FIG. 15 illustrates another example configuration of a phase compensated MLMS antenna array in accordance with some implementations of the subject technology.

FIG. 15 illustrates another example configuration of a phase compensated MLMS antenna array 1500 in accordance with some implementations of the subject technology. The phase compensated MLMS antenna array 1500 includes a power division layer 1502 and a superelement antenna array layer 1504. In some implementations, the power division layer 1502 is arranged orthogonal to the superelement antenna array layer 1504, and the power divisional layer 1502 superimposes at least a portion of the superelement antenna array layer 1504. Other angular orientations between the layers of a phase compensated MLMS antenna array can be implemented depending on antenna design criteria and desired antenna parameters and specifications without departing from the scope of the present disclosure.

It is appreciated that the disclosed examples are a dramatic contrast to the traditional complex systems incorporating multiple antennas controlled by digital beam forming. The disclosed examples increase the speed and flexibility of conventional antenna systems, while reducing the footprint and expanding performance.

The radar system 100 of FIG. 1 may implement the various aspects, configurations, processes and modules described herein in the present disclosure. The radar system 100 is configured for placement in an autonomous driving system or in another structure in an environment (e.g., buildings, billboards along roads, road signs, traffic lights, etc.) to complement and supplement information of individual vehicles, devices and so forth. The radar system scans the environment, and may incorporate infrastructure information and data, to alert drivers and vehicles as to conditions in their path or surrounding environment. The radar system is also able to identify targets and actions within the environment. The various examples described herein support autonomous driving with improved sensor performance, all-weather/all-condition detection, advanced decision-making algorithms and interaction with other sensors through sensor fusion. The radar system leverages intelligent metamaterial antenna structures and Artificial Intelligence (AI) techniques to create a truly intelligent digital eye for autonomous vehicles.

It is also appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. Moreover, the separation of various system components in the aspects described above should not be understood as requiring such separation in all aspects, and it should be understood that the described program components and systems can generally be integrated together in a single hardware product or packaged into multiple hardware products. Other variations are within the scope of the following claim.

What is claimed is:

1. A multi-layer, multi-steering (MLMS) antenna array, comprising:
   a superelement antenna array layer comprising a plurality of superelement subarrays, wherein each superelement subarray of the plurality of superelement subarrays includes a plurality of phase compensated slots for radiating a transmission signal;
   a power division layer configured to serve as a feed to the superelement antenna array layer; and
   a top layer disposed on the superelement antenna array layer.

2. The MLMS antenna array of claim 1, wherein the superelement antenna array layer includes a first region having a first set of superelement subarrays of the plurality of superelement subarrays and a second region having a second set of superelement subarrays of the plurality of superelement subarrays, wherein the first region includes slots with phase compensation that is different from that of slots in the second region.

3. The MLMS antenna array of claim 2, wherein slots in each of the plurality of superelement subarrays are separated by different distances and phase compensated with different phases based at least on which of the first region and the second region of the superelement antenna array layer the plurality of slots are positioned.

4. The MLMS antenna array of claim 2, wherein the plurality of phase compensated slots in a first superelement subarray of the plurality of superelement subarrays are separated by a first distance and the plurality of phase compensated slots in a second superelement subarray of the plurality of superelement subarrays are separated by a second distance different from the first distance.

5. The MLMS antenna array of claim 4, wherein the slots in the first set of elements of the first region are phase compensated to provide a same orientation in radio frequency (RF) beams radiating in a first direction from the first region based at least on the slots being separated in the first direction by a distance of $\lambda_g/2+\Delta d$, where $\lambda_g$ is the guide wavelength and $\Delta d$ is a predetermined distance offset that is added to the guide wavelength.

6. The MLMS antenna array of claim 5, wherein the slots in the first region provide steering of the radiated RF beams in a positive elevation direction that corresponds to the first direction.

7. The MLMS antenna array of claim 4, wherein the slots in the second set of elements of the second region are phase compensated to provide a same orientation in RF beams radiating in a second direction different from the first direction from the second region based at least on the slots being separated in the second direction by a distance of $\lambda_g/2-\Delta d$, where $\lambda_g$ is the guide wavelength and $\Delta d$ is a predetermined distance offset that is subtracted from the guide wavelength.

8. The MLMS antenna array of claim 7, wherein the slots in the second region provide steering of the radiated RF beams in a negative elevation direction that corresponds to the second direction.

9. The MLMS antenna array of claim 1, wherein the top layer comprises a metamaterial (MTM) array layer that includes a plurality of MTM cells, wherein the MTM array layer is configured to provide reactance control within the plurality of MTM cells.

10. The MLMS antenna array of claim 9, wherein the MTM array layer comprises one or more reactance control devices embedded on each MTM cell of the plurality of MTM cells.

11. The MLMS antenna array of claim 10, wherein the superelement antenna array layer is configured to radiate radio frequency (RF) beams at a predetermined phase shift provided by reactance control mechanisms in one or more of the power division layer or the MTM array layer, and phase compensation in the superelement antenna array layer.

12. A radar system for use in an autonomous driving vehicle, comprising:
   an antenna module configured to radiate a transmission signal in a plurality of directions with a multi-layer, multi-steering (MLMS) antenna having phase compensated slots on one or more layers of the MLMS antenna based on a controlled reactance and to generate radar data capturing a surrounding environment; and
   a perception module configured to detect and identify a target in the surrounding environment from the radar data and to control the antenna module.

13. The radar system of claim 12, wherein the antenna module comprises:
   a superelement antenna array layer comprising a plurality of superelement subarrays, wherein each superelement subarray of the plurality of superelement subarrays includes a plurality of phase compensated slots for radiating the transmission signal;
a power division layer configured to serve as a feed to the superelement antenna array layer, the power division layer comprising a dielectric layer interposed between a plurality of conductive layers; and
a top layer disposed on the superelement antenna array layer.

14. The radar system of claim 13, wherein the superelement antenna array layer includes a first region having a first set of superelement subarrays of the plurality of superelement subarrays and a second region having a second set of superelement subarrays of the plurality of superelement subarrays, wherein the first region includes slots with phase compensation that is different from that of slots in the second region.

15. The radar system of claim 14, wherein slots in each of the plurality of superelement subarrays are separated by different distances and phase compensated with different phases based at least on which of the first region and the second region of the superelement antenna array layer the plurality of slots are positioned.

16. The radar system of claim 14, wherein the slots in the first set of elements of the first region are phase compensated to provide a same orientation in radio frequency (RF) beams radiating in a first direction from the first region based at least on the slots being separated in the first direction by a distance of $\lambda_g/2+\Delta d$, where $\lambda_g$ is the guide wavelength and $\Delta d$ is a predetermined distance offset that is added to the guide wavelength, wherein the slots in the first region provide steering of the radiated RF beams in a positive elevation direction that corresponds to the first direction.

17. The radar system of claim 16, wherein the slots in the second set of elements of the second region are phase compensated to provide a same orientation in RF beams radiating in a second direction different from the first direction from the second region based at least on the slots being separated in the second direction by a distance of $\lambda_g/2-\Delta d$, where $\lambda_g$ is the guide wavelength and $\Delta d$ is a predetermined distance offset that is subtracted from the guide wavelength, wherein the slots in the second region provide steering of the radiated RF beams in a negative elevation direction that corresponds to the second direction.

18. A superelement antenna array, comprising:
a coupling aperture layer;
a slot array layer comprising an array of elements, wherein each element of the array of elements includes a plurality of slots penetrating through the slot array layer; and
an antenna layer interposed between the coupling aperture layer and the slot array layer,
wherein the slot array layer includes a first region having a first set of elements of the array of elements and a second region having a second set of elements of the array of elements, wherein the plurality of slots of each element of the array of elements are separated by different distances and phase compensated with different phases based at least on which of the first region and the second region of the slot array layer the plurality of slots are positioned.

19. The superelement antenna array of claim 18, wherein the slots in the first set of elements of the first region are phase compensated to provide a same orientation in radio frequency (RF) beams radiating in a first direction from the first region based at least on the slots being separated in the first direction by a distance of $\lambda_g/2+\Delta d$, where $\lambda_g$ is the guide wavelength and $\Delta d$ is a predetermined distance offset that is added to the guide wavelength, and wherein the slots in the first region provide steering of the radiated RF beams in a positive elevation direction that corresponds to the first direction.

20. The superelement antenna array of claim 19, wherein the slots in the second set of elements of the second region are phase compensated to provide a same orientation in RF beams radiating in a second direction different from the first direction from the second region based at least on the slots being separated in the second direction by a distance of $\lambda_g/2-\Delta d$, where $\lambda_g$ is the guide wavelength and $\Delta d$ is a predetermined distance offset that is subtracted from the guide wavelength, and wherein the slots in the second region provide steering of the radiated RF beams in a negative elevation direction that corresponds to the second direction.

* * * * *